US010977610B2

(12) United States Patent
Matson et al.

(10) Patent No.: US 10,977,610 B2
(45) Date of Patent: Apr. 13, 2021

(54) POWER TOOL COMMUNICATION SYSTEM

(71) Applicant: Milwaukee Electric Tool Corporation, Brookfield, WI (US)

(72) Inventors: Stephen Matson, Milwaukee, WI (US); Christian Coulis, Sussex, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/261,230

(22) Filed: Jan. 29, 2019

(65) Prior Publication Data

US 2019/0156278 A1 May 23, 2019

Related U.S. Application Data

(63) Continuation of application No. 15/183,445, filed on Jun. 15, 2016, now Pat. No. 10,339,496.
(Continued)

(51) Int. Cl.
*G06Q 10/08* (2012.01)
*G06F 3/0484* (2013.01)
(Continued)

(52) U.S. Cl.
CPC ......... *G06Q 10/087* (2013.01); *G06F 3/0482* (2013.01); *G06F 3/04842* (2013.01); *H04W 68/00* (2013.01)

(58) Field of Classification Search
CPC . G06Q 10/087; G06F 3/0482; G06F 3/04842; H04W 68/00; B25F 5/00
(Continued)

(56) References Cited

U.S. PATENT DOCUMENTS 3,597,742 A    8/1971 Phillips et al.
3,882,305 A    5/1975 Johnstone
(Continued)

FOREIGN PATENT DOCUMENTS

CN    103056849 A    4/2013
DE    10309703       9/2004
(Continued)

OTHER PUBLICATIONS

European Patent Office Search Report for Application No. 17810845.2 dated Oct. 11, 2019, 10 pages.
(Continued)

*Primary Examiner* — Andrew Joseph Rudy
(74) *Attorney, Agent, or Firm* — Michael Best & Friedrich LLP

(57) ABSTRACT

A mobile device and method for determining power tool attendance. The mobile device and method are able to generate a list of power tools that are missing based on being outside of communication range with the mobile device. For example, the mobile device includes a short-range transceiver, a memory, and a processor coupled to the memory and the short-range transceiver. The processor is configured to receive a list of a first plurality of power tools and receive, via a user interface, a selection to detect nearby tools. The processor is also configured to receive, via the short-range transceiver, identification signals from a second plurality of power tools and determine that a subset of the first plurality of power tools is missing based on the identification signals. The processor is further configured to generate an indication that the subset of the first plurality of power tools is missing.

20 Claims, 38 Drawing Sheets

Related U.S. Application Data

(60) Provisional application No. 62/175,957, filed on Jun. 15, 2015.

(51) Int. Cl.
*G06F 3/0482* (2013.01)
*H04W 68/00* (2009.01)

(58) Field of Classification Search
USPC .................................................. 705/28–30
See application file for complete search history.

(56) References Cited

U.S. PATENT DOCUMENTS

| | | | |
|---|---|---|---|
| 4,545,106 A | 10/1985 | Juengel | |
| 5,528,248 A | 6/1996 | Steiner et al. | |
| 5,563,607 A | 10/1996 | Loomis et al. | |
| 5,592,396 A | 1/1997 | Tambini et al. | |
| 5,604,506 A | 2/1997 | Rodal | |
| 5,629,693 A | 5/1997 | Janky | |
| 5,719,587 A | 2/1998 | Rodal | |
| 5,760,742 A | 6/1998 | Branch et al. | |
| 5,903,462 A | 5/1999 | Wagner et al. | |
| 6,031,488 A | 2/2000 | Hua et al. | |
| 6,046,687 A | 4/2000 | Janky | |
| 6,055,484 A | 4/2000 | Lysaght | |
| 6,097,337 A | 8/2000 | Bisio | |
| 6,123,241 A | 9/2000 | Walter et al. | |
| 6,157,313 A | 12/2000 | Emmermann | |
| 6,161,629 A | 12/2000 | Hohmann et al. | |
| 6,184,801 B1 | 2/2001 | Janky | |
| 6,225,890 B1 | 5/2001 | Murphy | |
| 6,232,874 B1 | 5/2001 | Murphy | |
| 6,279,668 B1 | 8/2001 | Mercer | |
| 6,343,276 B1 | 1/2002 | Barnett | |
| 6,349,266 B1 | 2/2002 | Lysaght et al. | |
| 6,390,205 B2 | 5/2002 | Wallgren et al. | |
| 6,405,598 B1 | 6/2002 | Bareggi | |
| 6,430,416 B1 | 8/2002 | Loomis | |
| 6,469,615 B1 | 10/2002 | Kady et al. | |
| 6,520,270 B2 | 2/2003 | Wissmach et al. | |
| 6,522,949 B1 | 2/2003 | Ikeda et al. | |
| 6,536,880 B2 * | 3/2003 | Takagi | B41J 2/14209 347/72 |
| 6,547,014 B2 | 4/2003 | McCallops et al. | |
| 6,611,755 B1 | 8/2003 | Coffee et al. | |
| 6,668,212 B2 | 12/2003 | Colangelo, II et al. | |
| 6,675,196 B1 | 1/2004 | Kronz | |
| 6,677,938 B1 | 1/2004 | Maynard | |
| 6,768,994 B1 | 1/2004 | Howard et al. | |
| 6,732,077 B1 | 5/2004 | Gilbert et al. | |
| 6,784,801 B2 | 8/2004 | Watanabe et al. | |
| 6,801,853 B2 | 10/2004 | Workman | |
| 6,848,516 B2 | 2/2005 | Giardino | |
| 6,853,909 B2 | 2/2005 | Scherzinger | |
| 6,872,121 B2 | 3/2005 | Wiener et al. | |
| 6,892,131 B2 | 5/2005 | Coffee et al. | |
| 6,913,087 B1 | 7/2005 | Brotto et al. | |
| 6,923,285 B1 | 8/2005 | Rossow et al. | |
| 6,934,631 B2 | 8/2005 | Dentinger et al. | |
| 6,938,689 B2 | 9/2005 | Farrant et al. | |
| 6,954,048 B2 | 10/2005 | Cho | |
| 6,980,812 B1 | 12/2005 | Sandhu et al. | |
| 6,981,311 B2 | 1/2006 | Seith et al. | |
| 7,020,555 B1 | 3/2006 | Janky et al. | |
| 7,034,711 B2 | 4/2006 | Sakatani et al. | |
| 7,035,710 B2 | 4/2006 | Balling | |
| 7,036,703 B2 | 5/2006 | Grazioli et al. | |
| 7,043,364 B2 | 5/2006 | Scherzinger | |
| 7,050,907 B1 | 5/2006 | Janky et al. | |
| 7,064,502 B2 | 6/2006 | Garcia et al. | |
| 7,086,483 B2 | 8/2006 | Arimura et al. | |
| 7,089,113 B1 | 8/2006 | Janky et al. | |
| 7,102,303 B2 | 9/2006 | Brotto et al. | |
| 7,117,169 B2 | 10/2006 | Zara et al. | |
| 7,123,149 B2 | 10/2006 | Nowak et al. | |
| 7,137,541 B2 | 11/2006 | Baskar et al. | |
| 7,158,885 B1 | 1/2007 | Janky et al. | |
| 7,211,972 B2 | 5/2007 | Garcia et al. | |
| 7,218,227 B2 | 5/2007 | Davis et al. | |
| 7,243,440 B2 | 7/2007 | DeKeyser | |
| 7,263,441 B1 | 8/2007 | Janky et al. | |
| 7,283,090 B2 | 10/2007 | Dentinger et al. | |
| 7,298,240 B2 | 11/2007 | Lamar | |
| 7,313,476 B2 | 12/2007 | Nichols et al. | |
| 7,319,395 B2 | 1/2008 | Puzio et al. | |
| 7,328,086 B2 | 2/2008 | Perry et al. | |
| 7,328,757 B2 | 2/2008 | Davies | |
| 7,330,129 B2 | 2/2008 | Crowell et al. | |
| 7,336,181 B2 | 2/2008 | Nowak et al. | |
| 7,343,764 B2 | 3/2008 | Solfronk | |
| 7,346,406 B2 | 3/2008 | Brotto et al. | |
| 7,346,422 B2 | 3/2008 | Tsuchiya et al. | |
| 7,348,921 B2 | 3/2008 | Yu | |
| 7,359,762 B2 | 4/2008 | Etter et al. | |
| 7,365,681 B2 | 4/2008 | Yu | |
| 7,376,599 B1 * | 5/2008 | Gerhardt | G06Q 10/06 705/26.43 |
| 7,382,272 B2 | 6/2008 | Feight | |
| 7,383,882 B2 | 6/2008 | Lerche et al. | |
| 7,398,153 B2 | 7/2008 | Workman et al. | |
| 7,415,355 B2 | 8/2008 | Janky et al. | |
| 7,431,682 B2 | 10/2008 | Zeiler et al. | |
| 7,437,204 B2 | 10/2008 | Lev-Ami et al. | |
| 7,453,355 B2 | 11/2008 | Bergstrom et al. | |
| 7,464,769 B2 | 12/2008 | Nakazawa et al. | |
| 7,466,263 B1 | 12/2008 | Yu | |
| 7,468,650 B2 | 12/2008 | Childress et al. | |
| 7,480,568 B2 | 1/2009 | Dentinger et al. | |
| 7,489,993 B2 | 2/2009 | Coffee et al. | |
| 7,540,334 B2 | 6/2009 | Gass et al. | |
| 7,580,794 B2 | 8/2009 | Janky et al. | |
| 7,613,590 B2 | 11/2009 | Brown | |
| 7,623,248 B2 | 11/2009 | Laflamme | |
| 7,627,427 B2 | 12/2009 | Nichols et al. | |
| 7,627,503 B1 | 12/2009 | Champagne et al. | |
| RE41,185 E | 3/2010 | Gilmore et al. | |
| 7,679,552 B2 | 3/2010 | Dentinger et al. | |
| 7,690,569 B2 | 4/2010 | Swanson et al. | |
| 7,739,138 B2 | 6/2010 | Chauhan et al. | |
| 7,742,874 B1 | 6/2010 | Mayfield et al. | |
| 7,750,811 B2 | 7/2010 | Puzio et al. | |
| 7,755,482 B2 | 7/2010 | Hubbard | |
| 7,772,850 B2 | 8/2010 | Bertness | |
| 7,773,945 B2 | 8/2010 | Reynolds | |
| 7,783,423 B2 | 8/2010 | Verma et al. | |
| 7,784,104 B2 | 8/2010 | Innami et al. | |
| 7,787,981 B2 | 8/2010 | Austin et al. | |
| 7,809,495 B2 | 10/2010 | Leufen | |
| 7,817,062 B1 | 10/2010 | Li et al. | |
| 7,830,993 B2 | 11/2010 | Riley et al. | |
| 7,850,071 B2 | 12/2010 | Sakamoto et al. | |
| 7,868,591 B2 | 1/2011 | Phillips et al. | |
| 7,898,391 B2 | 3/2011 | Maguire et al. | |
| 7,898,403 B2 | 3/2011 | Ritter et al. | |
| 7,900,524 B2 | 3/2011 | Calloway et al. | |
| 7,911,379 B2 | 3/2011 | Cameron | |
| 7,917,654 B2 | 3/2011 | Toivonen | |
| 7,928,845 B1 | 4/2011 | LaRosa | |
| 7,931,096 B2 | 4/2011 | Saha | |
| 7,941,330 B1 | 5/2011 | Buentello et al. | |
| 7,942,084 B2 | 5/2011 | Wilson, Jr. et al. | |
| 7,942,211 B2 | 5/2011 | Scrimshaw et al. | |
| 7,953,965 B2 | 5/2011 | Qin et al. | |
| 7,961,078 B1 | 6/2011 | Reynolds et al. | |
| 7,982,624 B2 | 7/2011 | Richter et al. | |
| 7,999,658 B1 | 8/2011 | Reynolds et al. | |
| 8,004,397 B2 | 8/2011 | Forrest et al. | |
| 8,004,664 B2 | 8/2011 | Etter et al. | |
| 8,005,647 B2 | 8/2011 | Armstrong et al. | |
| 8,020,768 B2 * | 9/2011 | Ramos-Elizondo | G06Q 10/087 235/385 |
| 8,022,814 B2 | 9/2011 | Yogeeswaran et al. | |

(56) References Cited

U.S. PATENT DOCUMENTS

| | | | |
|---|---|---|---|
| 8,032,152 B2 | 10/2011 | Manson et al. | |
| 8,041,591 B2 | 10/2011 | Kawai et al. | |
| 8,049,636 B2 | 11/2011 | Buckingham et al. | |
| 8,068,848 B2 | 11/2011 | Manson et al. | |
| 8,068,849 B2 | 11/2011 | Manson et al. | |
| 8,081,063 B2 | 12/2011 | Maguire | |
| 8,081,987 B2 | 12/2011 | Manson et al. | |
| 8,081,988 B2 | 12/2011 | Manson et al. | |
| 8,081,989 B2 | 12/2011 | Manson et al. | |
| 8,095,149 B2 | 1/2012 | Manson et al. | |
| 8,103,438 B2 | 1/2012 | Petrie et al. | |
| 8,125,529 B2 | 2/2012 | Skoskiewicz et al. | |
| 8,144,000 B2 | 3/2012 | Darby, Jr. et al. | |
| 8,159,345 B2 | 4/2012 | Stevens | |
| 8,161,613 B2 | 4/2012 | Schuele et al. | |
| 8,171,828 B2 | 5/2012 | Duvan et al. | |
| 8,210,275 B2 | 7/2012 | Suzuki et al. | |
| 8,224,518 B2 | 7/2012 | Cameron | |
| 8,225,319 B2 | 7/2012 | Laithwaite et al. | |
| 8,239,125 B2 | 8/2012 | Petrie et al. | |
| 8,255,358 B2 | 8/2012 | Ballew et al. | |
| 8,260,322 B2 | 9/2012 | Allen et al. | |
| 8,260,452 B2 | 9/2012 | Austin et al. | |
| 8,264,374 B2 | 9/2012 | Obatake et al. | |
| 8,279,112 B2 | 10/2012 | Carrick | |
| 8,280,784 B2 | 10/2012 | Hurtis et al. | |
| 8,281,871 B2 | 10/2012 | Cutler et al. | |
| 8,286,723 B2 | 10/2012 | Puzio et al. | |
| 8,294,424 B2 | 10/2012 | Bucur | |
| 8,306,836 B2 | 11/2012 | Nichols et al. | |
| 8,310,206 B2 | 11/2012 | Bucur | |
| 8,319,950 B2 | 11/2012 | Snyder | |
| 8,330,426 B2 | 12/2012 | Suzuki et al. | |
| 8,330,580 B2 | 12/2012 | Reynolds et al. | |
| 8,344,879 B2 | 1/2013 | Harmon et al. | |
| 8,351,982 B2 | 1/2013 | Rofougaran | |
| 8,374,926 B2 * | 2/2013 | Solomon | B65G 1/127 705/22 |
| 8,386,283 B2 | 2/2013 | Hand | |
| 8,406,697 B2 | 3/2013 | Arimura et al. | |
| 8,412,179 B2 | 4/2013 | Gerold et al. | |
| 8,429,034 B2 * | 4/2013 | Cerbone | G06Q 10/087 705/28 |
| 8,438,955 B2 | 5/2013 | Wilson, Jr. et al. | |
| 8,446,254 B2 | 5/2013 | Carrick et al. | |
| 8,482,721 B2 | 7/2013 | Snyder | |
| 8,484,370 B1 | 7/2013 | Coffee et al. | |
| 8,485,049 B2 | 7/2013 | Yokoyama et al. | |
| 8,493,243 B2 | 7/2013 | Ahmadi et al. | |
| 8,514,058 B2 | 8/2013 | Cameron | |
| 8,576,095 B2 | 11/2013 | Harmon et al. | |
| 8,589,273 B2 | 11/2013 | Creeden et al. | |
| 8,600,932 B2 | 12/2013 | Poling et al. | |
| 8,611,250 B2 | 12/2013 | Chen et al. | |
| 8,618,949 B2 | 12/2013 | Maynard et al. | |
| 8,638,375 B2 | 1/2014 | Amor Molares et al. | |
| 8,639,434 B2 | 1/2014 | Snoeck et al. | |
| 8,645,176 B2 | 2/2014 | Walton et al. | |
| 8,657,482 B2 | 2/2014 | Malackowski et al. | |
| 8,666,936 B2 | 3/2014 | Wallace | |
| 8,668,136 B2 | 3/2014 | Ahern et al. | |
| 8,682,541 B2 | 3/2014 | Best et al. | |
| 8,725,777 B2 | 5/2014 | Deking et al. | |
| 8,755,161 B2 | 6/2014 | James | |
| 8,768,609 B2 | 7/2014 | Maynard et al. | |
| 8,768,667 B2 | 7/2014 | Lindores | |
| 8,776,644 B2 | 7/2014 | Harper et al. | |
| 8,788,496 B2 | 7/2014 | Darby, Jr. et al. | |
| 8,791,806 B2 | 7/2014 | Granruth | |
| 8,818,617 B2 | 8/2014 | Miller et al. | |
| 8,855,937 B2 | 10/2014 | Lindores | |
| 8,915,430 B2 | 12/2014 | Shah et al. | |
| 8,919,456 B2 | 12/2014 | Ng et al. | |
| 8,928,463 B2 | 1/2015 | Landau et al. | |
| 8,947,225 B2 | 2/2015 | Best et al. | |
| 8,954,222 B2 | 2/2015 | Costantino | |
| 8,954,227 B2 | 2/2015 | Bertosa et al. | |
| 8,965,841 B2 | 2/2015 | Wallace | |
| 8,970,377 B2 | 3/2015 | Heine et al. | |
| 8,981,680 B2 | 3/2015 | Suda et al. | |
| 8,996,237 B2 | 3/2015 | Bertosa et al. | |
| 9,002,572 B2 | 4/2015 | Lipscomb et al. | |
| 9,031,585 B2 | 5/2015 | Kahle et al. | |
| 9,033,219 B2 | 5/2015 | Schoner et al. | |
| 9,041,561 B2 | 5/2015 | Wallace et al. | |
| 9,043,402 B2 | 5/2015 | Fosburgh et al. | |
| 9,061,392 B2 | 6/2015 | Forgues et al. | |
| 9,073,134 B2 | 7/2015 | Koeder et al. | |
| 9,092,753 B1 | 7/2015 | Fanelli | |
| 9,094,793 B2 | 7/2015 | Kusakari et al. | |
| 9,111,234 B2 | 8/2015 | Wallace et al. | |
| 9,126,317 B2 | 9/2015 | Lawton et al. | |
| 9,129,248 B2 | 9/2015 | Reynolds et al. | |
| 9,177,488 B2 | 11/2015 | Chontos et al. | |
| 9,194,917 B2 | 11/2015 | Brochhaus | |
| 9,216,505 B2 | 12/2015 | Rejman et al. | |
| 9,232,614 B2 | 1/2016 | Hiroi | |
| 9,233,457 B2 | 1/2016 | Wanek et al. | |
| 9,256,988 B2 | 2/2016 | Wenger et al. | |
| 9,257,865 B2 | 2/2016 | Hiuggins et al. | |
| 9,281,770 B2 | 3/2016 | Wood et al. | |
| 9,298,803 B2 | 3/2016 | Wallace | |
| 9,355,495 B2 | 5/2016 | Miller | |
| 9,386,907 B2 | 7/2016 | Vazales et al. | |
| 9,392,404 B2 | 7/2016 | Daoura et al. | |
| 9,443,432 B2 | 9/2016 | Tambini et al. | |
| 9,466,198 B2 | 10/2016 | Burch et al. | |
| 9,467,862 B2 | 10/2016 | Zeiler et al. | |
| 9,615,450 B2 | 4/2017 | Hwang et al. | |
| 9,641,964 B2 | 5/2017 | Kulkarni et al. | |
| 9,747,632 B2 * | 8/2017 | Hicks | G06Q 10/087 |
| 9,749,780 B2 * | 8/2017 | Huang | G01S 5/0252 |
| 9,754,238 B2 * | 9/2017 | Lyon | G06Q 10/0875 |
| 9,756,402 B2 | 9/2017 | Stampfl et al. | |
| 9,766,608 B2 * | 9/2017 | Wuertele | G05B 19/042 |
| 9,773,268 B2 | 9/2017 | Bonner et al. | |
| 9,792,655 B2 | 10/2017 | Griffin et al. | |
| 9,811,962 B2 | 11/2017 | Phillips et al. | |
| 9,815,166 B2 | 11/2017 | Goldstein et al. | |
| 9,819,132 B2 | 11/2017 | Peloquin et al. | |
| 9,886,680 B2 | 2/2018 | Johnson et al. | |
| 9,898,705 B2 | 2/2018 | Kahle et al. | |
| 9,898,884 B1 | 2/2018 | Arora et al. | |
| 9,909,760 B2 | 3/2018 | Chen et al. | |
| 9,916,560 B2 * | 3/2018 | Vasantham | G06Q 10/087 |
| 9,928,055 B1 | 3/2018 | Douberley et al. | |
| 9,934,545 B2 | 4/2018 | Kropp | |
| 9,990,669 B2 * | 6/2018 | Nuzzi | G06Q 30/0261 |
| 10,152,688 B2 | 12/2018 | DeBusk et al. | |
| 10,192,197 B2 * | 1/2019 | Rogers | G06Q 10/08 |
| 10,229,568 B2 * | 3/2019 | Man | G08B 13/2485 |
| 10,339,496 B2 * | 7/2019 | Matson | G06F 3/04842 |
| 10,354,181 B2 * | 7/2019 | Freienstein | B25F 5/02 |
| 10,395,076 B2 * | 8/2019 | Phillips | G06Q 10/087 |
| 10,410,169 B2 * | 9/2019 | Vasantham | G06F 16/285 |
| 10,430,755 B2 * | 10/2019 | Aji | G06Q 10/087 |
| 10,445,688 B2 * | 10/2019 | Kondragunta | G06F 16/2365 |
| 10,474,987 B2 * | 11/2019 | Corona | F25D 29/00 |
| 10,580,060 B2 * | 3/2020 | Olschan | G06Q 30/0633 |
| 10,625,909 B2 * | 4/2020 | Aman | B65D 77/0406 |
| 10,647,509 B2 * | 5/2020 | Lyon | H04L 67/10 |
| 10,650,654 B2 * | 5/2020 | Batra | G08B 13/2462 |
| 2002/0128913 A1 * | 9/2002 | Ower | G06Q 10/087 705/22 |
| 2003/0121677 A1 | 3/2003 | Kady et al. | |
| 2003/0088442 A1 * | 5/2003 | Michael | G06Q 10/087 705/3 |
| 2004/0182587 A1 | 9/2004 | May et al. | |
| 2005/0035659 A1 | 2/2005 | Hahn et al. | |
| 2005/0110639 A1 | 5/2005 | Puzio et al. | |
| 2006/0009879 A1 | 1/2006 | Lynch et al. | |
| 2006/0076385 A1 | 4/2006 | Etter et al. | |
| 2006/0220955 A1 | 10/2006 | Hamilton | |
| 2008/0001755 A1 | 1/2008 | Puzio et al. | |

(56) References Cited

U.S. PATENT DOCUMENTS

| | | |
|---|---|---|
| 2008/0084324 A1 | 4/2008 | Wallace et al. |
| 2008/0084332 A1 | 4/2008 | Ritter et al. |
| 2008/0084333 A1 | 4/2008 | Forrest et al. |
| 2008/0084334 A1 | 4/2008 | Ballew |
| 2008/0086320 A1 | 4/2008 | Ballew et al. |
| 2008/0086321 A1 | 4/2008 | Walton |
| 2008/0086322 A1 | 4/2008 | Wallace |
| 2008/0086323 A1 | 4/2008 | Petrie et al. |
| 2008/0086349 A1 | 4/2008 | Petrie et al. |
| 2008/0086391 A1 | 4/2008 | Maynard et al. |
| 2008/0086427 A1 | 4/2008 | Wallace |
| 2008/0086428 A1 | 4/2008 | Wallace |
| 2008/0086497 A1 | 4/2008 | Wallace et al. |
| 2008/0086508 A1 | 4/2008 | Ballew |
| 2008/0086509 A1 | 4/2008 | Wallace |
| 2008/0086685 A1 | 4/2008 | Janky et al. |
| 2008/0181398 A1 | 7/2008 | Pappu |
| 2008/0252446 A1 | 10/2008 | Dammertz |
| 2009/0015585 A1 | 1/2009 | Klusza |
| 2009/0250364 A1 | 10/2009 | Gerold et al. |
| 2009/0251330 A1 | 10/2009 | Gerold et al. |
| 2009/0267769 A1 | 10/2009 | Stevens |
| 2010/0096151 A1 | 4/2010 | Östling |
| 2010/0154599 A1 | 6/2010 | Gareis |
| 2010/0176766 A1 | 7/2010 | Brandner et al. |
| 2010/0181964 A1 | 7/2010 | Kadous et al. |
| 2011/0056716 A1 | 3/2011 | Jönsson et al. |
| 2011/0067895 A1 | 3/2011 | Nobe et al. |
| 2011/0073343 A1 | 3/2011 | Sawano et al. |
| 2011/0162858 A1 | 7/2011 | Coste |
| 2011/0282631 A1 | 11/2011 | Poling et al. |
| 2011/0302051 A1 | 12/2011 | Arbatli |
| 2011/0309931 A1 | 12/2011 | Rose |
| 2012/0167721 A1 | 7/2012 | Fluhrer |
| 2012/0168189 A1 | 7/2012 | Eckert |
| 2012/0267134 A1 | 10/2012 | Matthias et al. |
| 2012/0292070 A1 | 11/2012 | Ito et al. |
| 2012/0325507 A1 | 12/2012 | Fluhrer et al. |
| 2013/0024245 A1 | 1/2013 | Nichols et al. |
| 2013/0035978 A1 | 2/2013 | Richardson et al. |
| 2013/0071815 A1 | 3/2013 | Hudson et al. |
| 2013/0087355 A1 | 4/2013 | Oomori et al. |
| 2013/0109375 A1 | 5/2013 | Zeiler et al. |
| 2013/0126202 A1 | 5/2013 | Oomori et al. |
| 2013/0133907 A1 | 5/2013 | Chen et al. |
| 2013/0133911 A1 | 5/2013 | Ishikawa et al. |
| 2013/0138465 A1 | 5/2013 | Kahle et al. |
| 2013/0138606 A1 | 5/2013 | Kahle et al. |
| 2013/0153250 A1 | 6/2013 | Eckert |
| 2013/0187587 A1 | 7/2013 | Knight et al. |
| 2013/0188058 A1 | 7/2013 | Nguyen et al. |
| 2013/0191417 A1 | 7/2013 | Petrie et al. |
| 2013/0204753 A1 | 8/2013 | Wallace |
| 2013/0255980 A1 | 10/2013 | Linehan et al. |
| 2013/0304545 A1 | 11/2013 | Ballew et al. |
| 2013/0327552 A1 | 12/2013 | Lovelass et al. |
| 2014/0006295 A1 | 1/2014 | Zeiler et al. |
| 2014/0015389 A1 | 1/2014 | Vatterott et al. |
| 2014/0052384 A1 | 2/2014 | Poling et al. |
| 2014/0070924 A1 | 3/2014 | Wenger et al. |
| 2014/0107853 A1 | 4/2014 | Ashinghurst et al. |
| 2014/0122143 A1 | 5/2014 | Fletcher et al. |
| 2014/0149416 A1 | 5/2014 | Wallace |
| 2014/0151079 A1 | 6/2014 | Furui et al. |
| 2014/0158389 A1 | 6/2014 | Ito et al. |
| 2014/0159662 A1 | 6/2014 | Furui et al. |
| 2014/0159919 A1 | 6/2014 | Furui et al. |
| 2014/0159920 A1 | 6/2014 | Furui et al. |
| 2014/0166324 A1 | 6/2014 | Puzio et al. |
| 2014/0184397 A1 | 7/2014 | Volpert |
| 2014/0266024 A1 | 9/2014 | Chinnadurai et al. |
| 2014/0284070 A1 | 9/2014 | Ng et al. |
| 2014/0292245 A1 | 10/2014 | Suzuki et al. |
| 2014/0304545 A1 | 10/2014 | Chen et al. |
| 2014/0316837 A1 | 10/2014 | Fosburgh et al. |
| 2014/0324194 A1 | 10/2014 | Larsson et al. |
| 2014/0331830 A1 | 11/2014 | King et al. |
| 2014/0334270 A1 | 11/2014 | Kusakawa |
| 2014/0336810 A1 | 11/2014 | Li et al. |
| 2014/0336955 A1 | 11/2014 | Li et al. |
| 2014/0350716 A1 | 11/2014 | Fly et al. |
| 2014/0365259 A1 | 12/2014 | Delplace et al. |
| 2014/0379136 A1 | 12/2014 | Schlegel et al. |
| 2015/0000944 A1 | 1/2015 | Dusselberg et al. |
| 2015/0002089 A1 | 1/2015 | Rejman et al. |
| 2015/0042247 A1 | 2/2015 | Kusakawa |
| 2015/0084745 A1 | 3/2015 | Hertz et al. |
| 2015/0097674 A1 | 4/2015 | Mondal et al. |
| 2015/0122524 A1 | 5/2015 | Papp |
| 2015/0127205 A1 | 5/2015 | Brochhaus |
| 2015/0135306 A1 | 5/2015 | Winkler et al. |
| 2015/0179036 A1 | 6/2015 | Heine et al. |
| 2015/0191096 A1 | 7/2015 | Becker et al. |
| 2015/0340921 A1 | 11/2015 | Suda et al. |
| 2015/0356858 A1 | 12/2015 | Daoura |
| 2016/0012389 A1* | 1/2016 | Xie ............... G06Q 10/087 705/28 |
| 2016/0088482 A1 | 3/2016 | Zeiler |
| 2016/0094934 A1 | 3/2016 | Yang et al. |
| 2017/0008159 A1 | 1/2017 | Boeck et al. |
| 2017/0201295 A1 | 7/2017 | Kusakawa |
| 2017/0353847 A1 | 12/2017 | Coulis et al. |
| 2018/0190103 A1 | 7/2018 | Daoura et al. |

FOREIGN PATENT DOCUMENTS

| | | |
|---|---|---|
| DE | 202006014606 | 1/2007 |
| EP | 2147750 | 1/2010 |
| EP | 2786338 | 10/2014 |
| EP | 2884814 | 6/2015 |
| EP | 2934030 | 10/2015 |
| JP | 2000176850 | 6/2000 |
| JP | 2004072563 | 3/2004 |
| JP | 2006123080 | 5/2006 |
| WO | WO95021386 | 8/1995 |
| WO | WO2002030624 | 4/2002 |
| WO | WO2007090258 | 8/2007 |
| WO | WO2008063983 | 5/2008 |
| WO | 2010114351 A2 | 10/2010 |
| WO | WO2013063106 | 5/2013 |
| WO | WO2013063507 | 5/2013 |

OTHER PUBLICATIONS

United States Patent Office Action for U.S. Appl. No. 16/522,856 dated Aug. 16, 2019 (14 pages).
International Search Report and Written Opinion for Application No. PCT/2017/036128 dated Sep. 12, 2017.
ASAP Systems "Barcloud Inventory Management & Asset Tracking Software" 2015, downloaded Jul. 13, 2015, (23 pages).
Gigatrak, <http://www.gigatrak.com/>, 2010 (3 pages).
International Search Report and Written Opinion for Application No. PCT/IB2016/000987 dated Dec. 9, 2016, 14 pages.
ToolWatch, "ToolWatch Enterprise", 2006 (8 pages).
Trimble Alltrak, "Take Control of your Assets", 2009, downloaded Jul. 13, 2015 (4 pages).
European Patent Office Search Report for Application No. 16811092.2 dated Oct. 2, 2018, 8 pages.
United States Patent Office Action for U.S. Appl. No. 16/164,960 dated Feb. 8, 2019, 14 pages.
European Patent Office Examination Report for Application No. 16811092.2 dated Jan. 17, 2020 (5 pages).

* cited by examiner

POWER TOOL COMMUNICATION SYSTEM

CROSS-REFERENCE TO RELATED APPLICATIONS

This application is a continuation of U.S. patent application Ser. No. 15/183,445, filed Jun. 15, 2016, now U.S. Pat. No. 10,339,496, which claims priority to U.S. Provisional Patent Application No. 62/175,957, filed on Jun. 15, 2015, the entire contents of all of which are hereby incorporated by reference.

FIELD OF THE INVENTION

The present invention relates to methods and systems of maintaining inventory systems for power tool devices, and generating reports for power tool devices.

SUMMARY

In one embodiment, the invention provides a method of adding a power tool device to an inventory list. The method includes receiving, via a user interface, a request to add a nearby power tool device and receiving, via a short-range transceiver, identification from a plurality of power tool devices. The method also includes displaying, via the user interface, the identification information of the plurality of power tool device and receiving, via the user interface, a selection of a power tool device from the plurality of power tool devices. The method further includes adding, using a processor, the power tool device to the inventory list.

In one embodiment, the invention provides a method of analyzing metrics for a power tool device. The method includes receiving, via a short-range transceiver, identification signals from a plurality of power tool devices and displaying, via a user interface, identification information of the plurality of power tool devices. The method also includes receiving, via the user interface, a selection of a power tool device to be analyzed from the plurality of power tool devices and receiving, via the short-range transceiver, metrics information regarding the power tool device in response to the selection of the power tool device to be analyzed. The method further includes displaying, via the user interface, metrics information of the power tool device.

In one embodiment, the invention provides a method for determining power tool attendance. The method includes receiving a list of a first plurality of power tools and receiving, via a user interface, a selection to detect nearby tools. The method also includes receiving, via a short-range transceiver, identification signals from a second plurality of power tools and determining, using a processor, that a subset of the first plurality of power tools is missing based on the identification signals. The method further includes generating, using the processor, an indication that the subset of the first plurality of power tools is missing.

In one embodiment, the invention provides a communication system including a communicating power tool device and a non-communicating power tool device. The communicating power tool device can communicate wirelessly with a mobile external device. The mobile external device including a processor configured to receive information from an external server regarding the communicating power tool device, receive information from the user regarding the non-communicating power tool device, and group the communicating power tool wireless device and the non-communicating power tool device together as a single inventory.

In another embodiment the invention provides a method of determining whether any power tool devices are missing from an inventory. The method includes receiving a list of power tool devices from a remote server, directly communicating with a plurality of power tool devices, generating a list of the plurality of power tool devices; comparing the list of power tool devices received from the remote server and the plurality of devices, and determining whether a power tool device is missing.

Other aspects of the invention will become apparent by consideration of the detailed description and accompanying drawings.

BRIEF DESCRIPTION OF THE DRAWINGS

FIG. 7 illustrates an exemplary screenshot of pages for adding a power tool device from a disconnected manufacturer.

FIG. 8 illustrates an edit screen for one of the power tool devices.

FIGS. 18A-G illustrate exemplary guide screens that allow the user to input information for adding a power tool device to the inventory.

FIGS. 19A-F illustrate exemplary editing screens to allow the user to edit information associated with a power tool device.

FIG. 29 illustrates an exemplary information screen.

DETAILED DESCRIPTION

Figure 1:
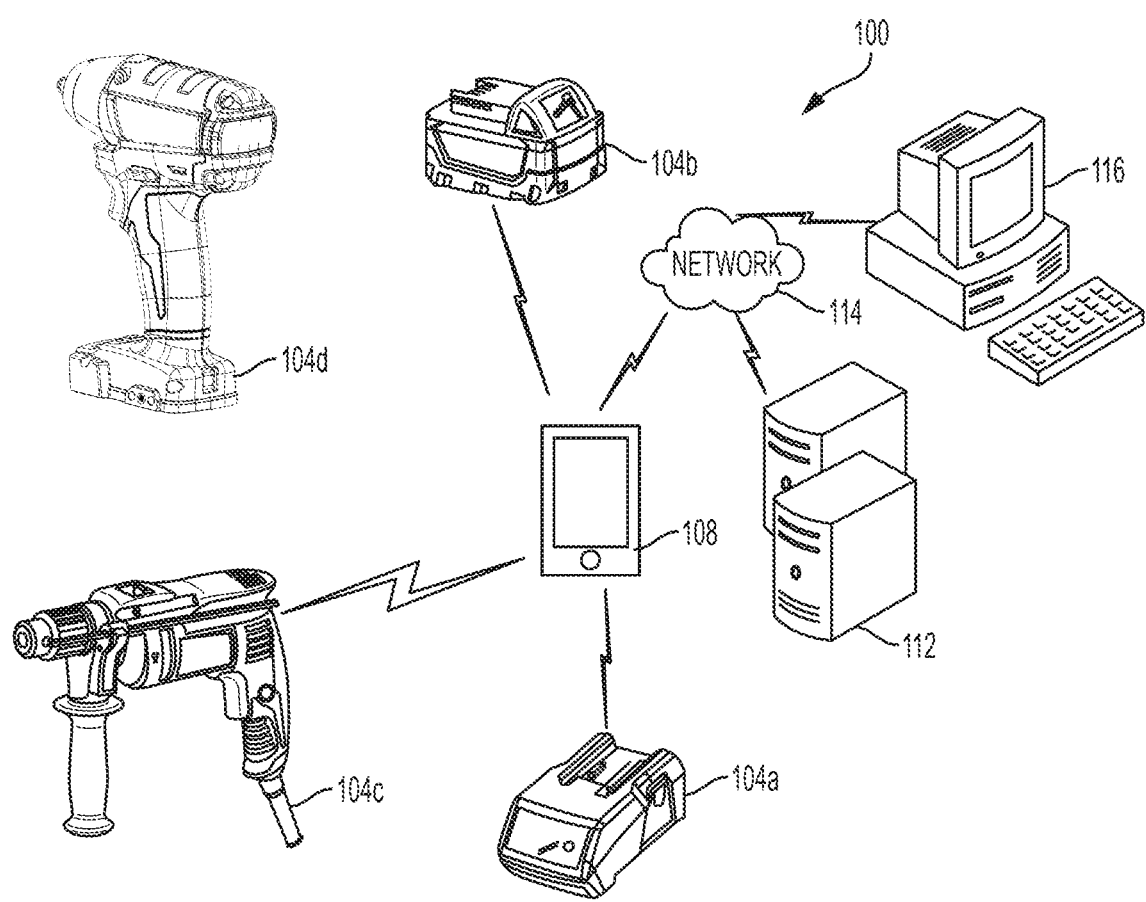
FIG. 1 illustrates a communication system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

FIG. 1 illustrates a power tool communication system 100. The power tool communication system 100 includes, among other things, a plurality of power tool devices 104a-d, a mobile electronic device 108, a remote server 112, a network 114, and an external device 116. The power tool devices 104a-d include power tools and devices used in relation to the operation of power tools. For example, the power tool devices 104a-d can include a power tool battery charger 104a, a battery pack 104b, power tools 104c-d, as well as other devices used in conjunction with the power tools. Each power tool 104c-d may be the same tool or may be different tools. Accordingly, each power tool 104c-d is configured to perform one or more specific tasks (e.g., drilling, cutting, fastening, pressing, lubricant application, sanding, heating, grinding, bending, forming, impacting, polishing, lighting, etc.). The task associated with each of the power tools 104c-d may also be referred to as the primary function(s) of the power tool 104c-d. The power tool devices 104 in the communication system 100 are representative and exemplary. The communication system 100 may include more or fewer power tool devices 104 and various combinations of power tool devices 104. Similarly, the power tool devices 104 in the communication system 100 may be from the same or different manufacturers.

Figure 2:
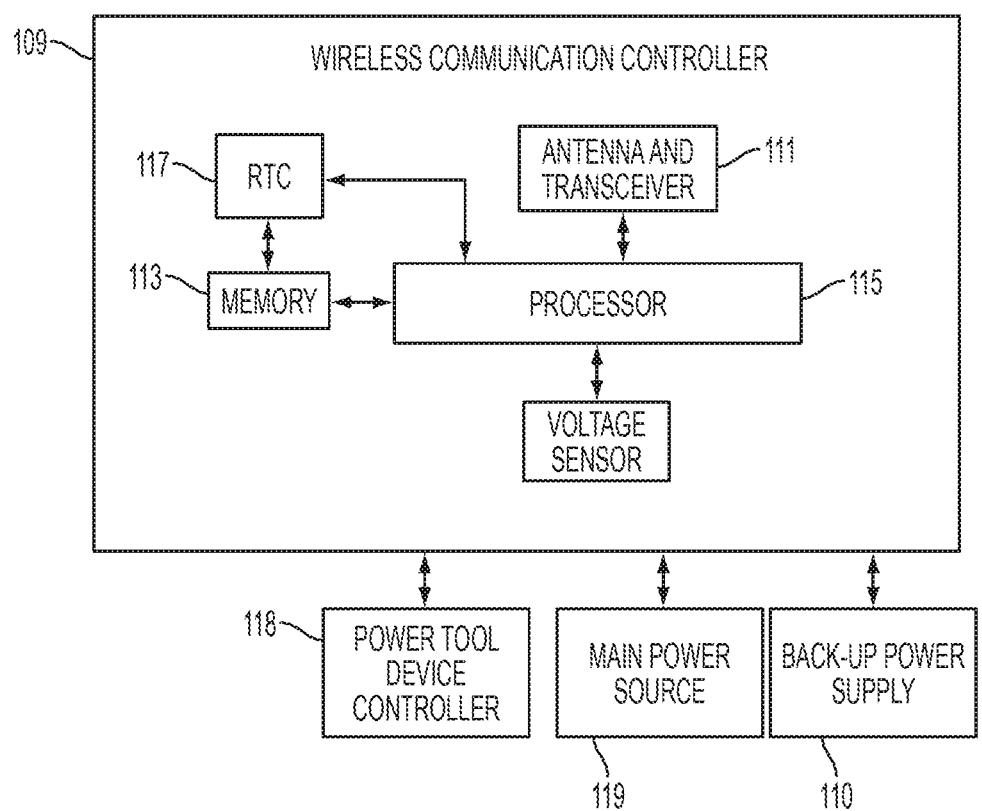
FIG. 2 illustrates a schematic diagram of a wireless communication module in communicating power tool devices.

As shown in FIG. 2, some of the power tool devices 104a-c include, among other things, a wireless communication module 109 (also referred to as a wireless communication controller 109) and a back-up power supply 110. The wireless communication module 109 is coupled to a controller 118 of the power tool device 104, a main power source 119 for the power tool device 104 (e.g., a battery pack and/or a wall outlet), and to a back-up power supply 110. The wireless communication module 109 includes a radio transceiver and antenna 111, a memory 113, a processor 115, and, in some embodiments, a real-time clock (RTC) 117. The wireless communication module 109 is configured to receive data from the controller 118 of the power tool device 104, and relay the information to the mobile electronic device 108 via the antenna and transceiver 111. In a similar manner, the wireless communication module 109 is configured to receive information (e.g., configuration and programming information) from the mobile electronic device 108 via the antenna and transceiver 111 and relay the information to the power tool controller 118.

The memory 113 of the wireless communication module 109 can store data related to communications between the power tool 104 and the mobile electronic device 108. The processor 115 for the wireless communication module 109 controls wireless communications between the power tool 104 and the mobile electronic device 108. For example, the processor 115 associated with the wireless communication module 109 buffers incoming and/or outgoing data, communicates with the controller 118 of the power tool device 104, and determines the communication protocol and/or settings to use in wireless communications. The wireless communication module 109 receives electrical power from the main power source 119 and from the secondary power supply (e.g., back-up power supply 110) based on which power supply is available. When the main power source 119 is connected to the power tool device 104 and the main power source 119 holds sufficient power, the main power source 119 provides electrical power to the wireless communication module 109. If, on the other hand, the main power source 119 is not connected to the power supply, the back-up power supply 110 provides power to the wireless communication module 109. The back-up power supply 110, however, has limited supply of power and could be quickly drained if used to power significant electronic data exchange between the power tool devices 104 and the mobile electronic device 108. Therefore, in some embodiments, when the back-up power supply 110 powers the wireless communication module 109, the power tool device 104 outputs (e.g., broadcasts) only identification information for the power tool device 104, but does not enable further data exchange between the power tool device 104 and the mobile electronic device 108.

In some embodiments, the back-up power supply is a coin cell battery. The coin cell battery is removable from the power tool device 104 and is, therefore, located in an accessible area of the power tool device 104. In many embodiments, the back-up power supply 110 is accessed and replaced by the user/operator of the power tool device 104. In other embodiments, however, the back-up power supply 110 is located in a hard-to-access portion of the power tool device, and is replaced by a professional serviceman. For instance, rather than being located in a dedicated battery recess separate from the motor and other circuitry and accessible via a sliding or removable door on the tool housing, the back-up power supply 110 may require opening the main housing using one or more tools.

In the illustrated embodiment, the wireless communication module 109 is a Bluetooth® controller. The Bluetooth® controller communicates with the mobile electronic device 108 employing the Bluetooth® protocol. Therefore, in the illustrated embodiment, the mobile electronic device 108 and the power tool 104 are within a communication range (i.e., in proximity) of each other while they exchange data. In other embodiments, the wireless communication module 109 communicates using other protocols (e.g., Wi-Fi, cellular protocols, etc.) over a different type of wireless networks. For example, the wireless communication module 109 may be configured to communicate via Wi-Fi through a wide area network such as the Internet or a local area network, or to communicate through a piconet (e.g., using infrared or NFC communications). The communication via the communication module 109 may be encrypted to protect the data exchanged between the power tool 104 and the mobile electronic device 108 from third parties.

The RTC 117 increments and keeps time independently of the other power tool components. In the illustrated embodiment, the RTC 117 is powered through the wireless communication module 109 when the wireless communication module 109 is powered. In some embodiments, however, the RTC 117 is a separate component from the wireless communication module 109. In such embodiments, the RTC 117 receives power from the main power source 119 when the battery pack is connected to the power tool 104 and receives power from the back-up power supply 110 when the battery pack is not connected to the power tool 104. Therefore, the RTC 117 keeps track of time regardless of whether the power tool 104 is in operation, and regardless of whether the battery pack is connected to the power tool 104. When no power source is present (i.e., the battery pack is detached from the power tool 104 and the back-up power supply 110 is removed or depleted), the RTC 117 stores the last valid time. When a power source is replaced (i.e., the battery pack is attached to the power tool 104 or/and the coin cell 110 is replaced), the RTC 117 uses the stored time as a starting point to resume keeping time.

Other power tool devices (e.g., power tool 104d), however, do not communicate with the mobile electronic device 108, and therefore do not include the wireless communication module 109. In some embodiments, some of the power tool devices may include a wireless communication module 109, but may not be configured to communicate with the mobile electronic device 108 because, for example, the wireless communication module 109 utilizes a different communication protocol, and/or the power tool device 104 does not know how to interpret the instructions from the mobile electronic device 108.

In some embodiments, the mobile electronic device 108 is a dedicated electronic device. In other words, the mobile electronic device 108 is specifically manufactured to communicate with the power tool devices 104 and the remote server 112. In some embodiments, the dedicated electronic device may include a ruggedized exterior to withstand the environmental conditions of different worksites.

In other embodiments, the mobile electronic device 108 is not a dedicated electronic device and is configured to perform various functions not related to communicating with power tools 104. For example, the mobile electronic device 108 may be configured to place phone calls, play videos, share media, etc. The mobile electronic device 108 may be, for example, a laptop computer, a tablet computer, a smartphone, a cellphone, a personal digital assistant (PDA), or another electronic device capable of communicating wirelessly with the communicating power tool devices 104a-c and providing a graphical user interface.

The communicating power tool devices 104a-c may communicate power tool status, power tool operation statistics, power tool identification, stored power tool usage information, power tool maintenance data, battery pack identification, battery pack stored voltage, battery pack charge and discharge characteristics, and the like to the mobile electronic device 108. Therefore, by using the mobile electronic device 108, a user can access stored power tool device usage or power tool device maintenance data. The mobile electronic device 108 can also transmit data to each of the communicating power tool devices 104a-c for power tool configuration, firmware updates, or to send commands (e.g., turn on work light). The mobile electronic device 108 also allows a user to set operational parameters, safety parameters, select operating modes, and the like for the communicating power tool devices 104a-c.

The mobile electronic device 108 can also establish wireless communication with the remote server 112 through the network 114. The mobile electronic device 108 can forward to the remote server 112 at least some of the information received from the communicating power tool devices 104a-c. For example, the mobile electronic device 108 can forward new user-defined tool modes, power tool usage information, new identification information, power tool device status, and the like. The remote server 112 provides additional storage and processing power and thereby enables the communication system 100 to encompass more power tool devices 104a-d without being limited to the storage and processing capabilities of the mobile electronic device 108. Furthermore, the remote server 112 can also communicate with the external device 116 through the network 114 or through a different network to provide additional functionality.

The external device 116 may be, for example, a laptop computer, a desktop computer, a workstation from a local network, or another device configured to communicate with the remote server 112 through the network 114. The remote server 112 can forward the information received from the mobile electronic device 108 to the external device 116 through the network 114. Forwarding the information allows other users, who may, for example, be at a remote location from the power tool devices 104a-d and the mobile electronic device 108, to receive information regarding various parameters, characteristics, and status of the power tool devices 104a-d. The external device 116 can also generate and send new information to update data on the server 112, the mobile electronic device 108, and the communicating power tool devices 104a-c. For example, the external device 116 can assign locations for the specific tool devices, and the like.

In some implementations, the power tool devices 104a-d are owned by a larger entity (e.g., a contracting company). The larger entity then allows specific users (e.g., operators) to use the power tool devices 104a-d to perform specific tasks related to a project. Establishing the communication system 100 between power tool devices 104a-d and the electronic devices 108, 112, 116 allows individual users and/or larger entities to accurately control, manage, maintain, and operate large groups of power tool devices without cumbersome tracking, inventory, and programming methods.

In particular, the communication system 100 implements an inventory system. The inventory system provides information regarding the number of power tool devices 104a-d in the communication system 100, the location of the power tool devices 104a-d, the status of the power tool devices 104a-d, the purchasing information of the power tool devices 104a-d, and the like. The inventory information gathered and provided by the inventory system allows users (e.g., buyers) to buy desired and/or necessary tool devices, arrange for maintenance of tool devices, and track the power tool devices 104a-d.

Figure 3:
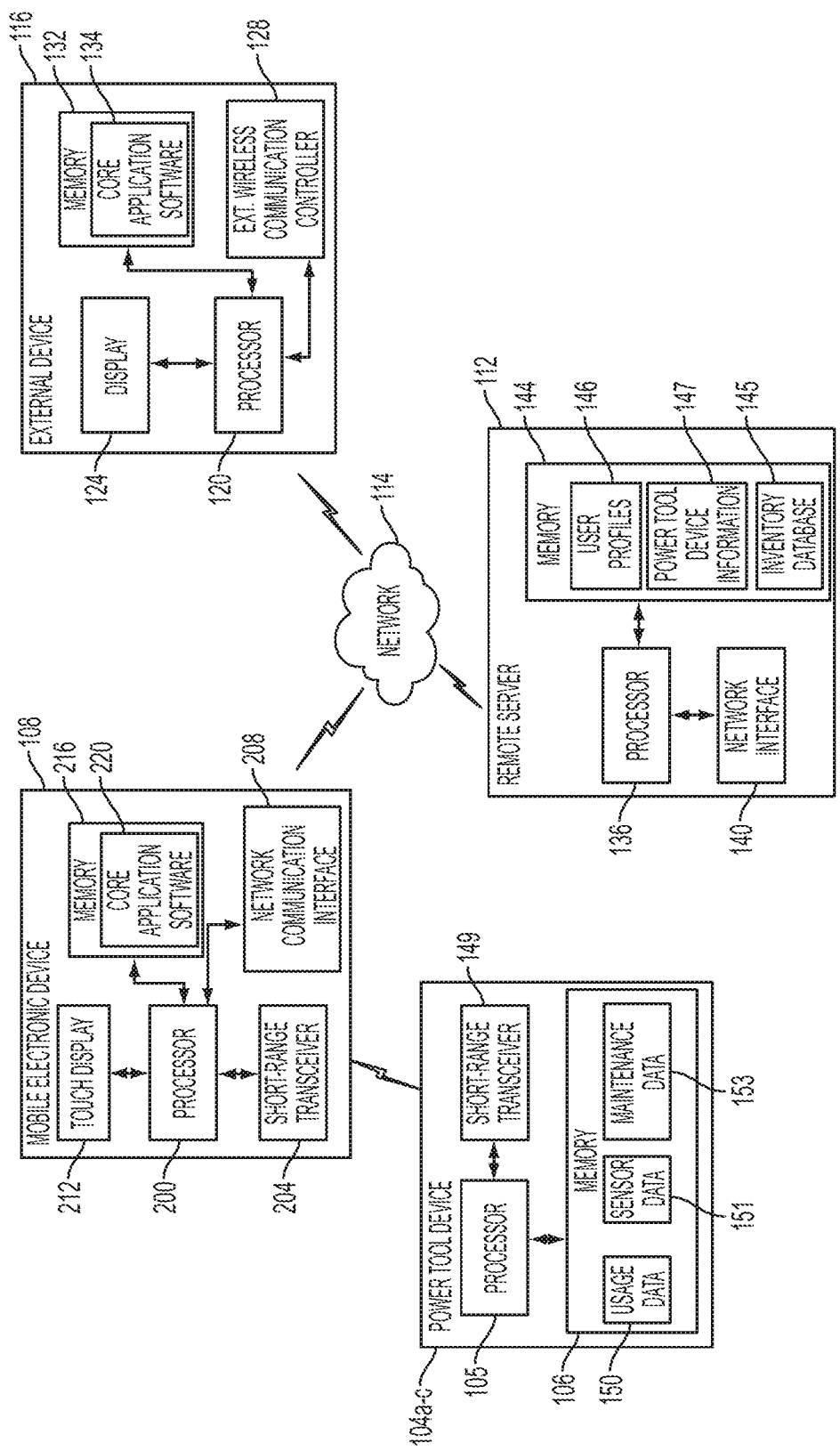
FIG. 3 illustrates a schematic diagram of the communication system.

For the inventory system, the server 112 stores an inventory database 145 (as shown in FIG. 3). The inventory database 145 includes user profiles and power tool device information. The inventory database 145 stores information regarding each power tool device 104 such as, for example, serial and/or model number, a customized name associated with the power tool device 104, a digital photograph or image associated with the power tool device 104, a category for the power tool device 104 (e.g., drill, impact wrench, power generator, etc.), maintenance information, purchasing information, location information, tool device usage data associated it the power tool device 104, and the like. The inventory database 145 also stores user profiles that indicate which power tool devices 104 are associated with each user. The inventory database 145 may also store additional settings information for the user profile such as identification information for each user (e.g., username and password) to properly identify each user, power tool devices the user has been associated with in the past, sub-inventories associated with the user, information regarding power tool device purchases and the like. In some embodiments, the inventory database 145 may also store settings for the graphical user interface generated by the mobile electronic device 108 and/or the external device 116. For example, the inventory database 145 may store display options or settings for to display power tool devices associated with a particular user.

Both the mobile electronic device 108 and the external device 116 execute the inventory system and provide desired information to the user. The mobile electronic device 108 and the external device 116 are able to synchronize the inventory information by communicating with the remote server 112 through the network 114. Therefore, a user can add and/or remove power tool devices from the inventory through the mobile electronic device 108 and/or through the external device 116. Stated another way, the mobile electronic device 108 and the external device 116 provide user interfaces into an inventory database 145 primarily stored on the server 112.

FIG. 3 illustrates a schematic diagram of the components of the communication system 100. As shown in FIG. 3, the external device 116 includes, among other things, a processor 120, a display 124, an external wireless communication controller 128 (e.g., a Wi-Fi communication controller), and a memory 132. The external wireless communication controller 128 allows the external device 116 to connect to the remote server 112 and exchange information regarding the power tools devices 104a-d. The memory 132 stores a core application software 134 that enables the external device 116 to execute an inventory and reporting application. The processor 120 accesses the core application software 134 in memory 132 to generate a graphical user interface shown on the display 124. The processor 120 is also coupled to the external wireless communication controller 128 to control the communication to and from the remote server 112.

The external device 116 launches the inventory and reporting application in response to a user input (e.g., selecting an icon, opening a webpage, etc.). When the external device 116 launches the inventory and reporting application, the external device 116 requests a user to input a username (e.g., e-mail address) and a password, thereby identifying him/herself to the external device 116, to the inventory and reporting application, and to the server 112. Once the user has inputted his/her account information, the external wireless communication controller 128 communicates with the remote server 112 to ensure that the user is an authorized user and to obtain information regarding the power tool devices 104 that are specifically associated with the identified user.

As shown in FIG. 3, the remote server 112 includes a processor 136, a network interface 140, and a memory 144. The processor 136 is coupled to the network interface 140 to allow communication with the mobile electronic device 108 and the external device 116 through the network 114. The processor 136 is also coupled to the memory 144 to store and access information associated with various users (for example, user profiles 146) and information associated with various power tool devices (for example, power tool device information 147). In particular, the external device 116 receives a list of power tool devices and associated information that are associated with the identified user.

As shown in FIG. 3, the power tools 104a-c include a processor 105, a memory 106 and a short-range transceiver 149. In some embodiments, the transceiver 149 is implemented as the wireless communication controller 109. The memory 106 stores usage data 150, sensor data 151 and maintenance data 153 of the power tools 104 a-c.

Figure 4:
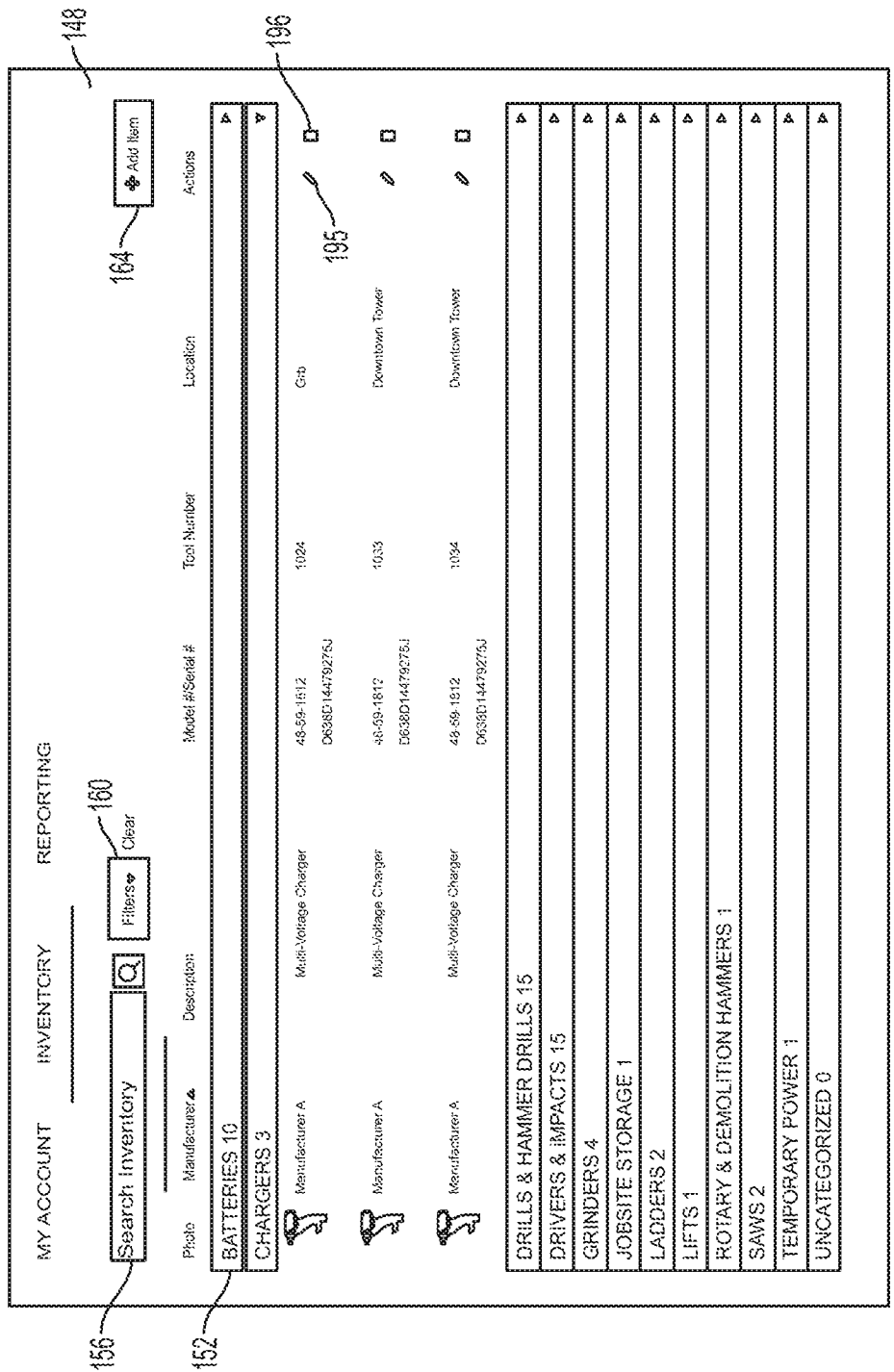
FIG. 4 illustrates an exemplary home page for the inventory and reporting application.

FIG. 4 illustrates an exemplary screenshot of a home screen 148 of the inventory and reporting application launched by the external device 116. As shown in FIG. 4, the inventory and reporting application displays a list 152 of power tool devices 104 associated with a particular user. The power tool devices 104 are arranged by category. For example, all the batteries associated with the identified user are listed under batteries, while the impact power tools are listed under the category "Drivers & Impacts." In the illustrated embodiment, the user can create and delete categories according to his/her preferences. Listing the power tool devices 104 according to their category allows a user to easily identify particular power tool devices and gain a better understanding of the variety of the power tool devices in his/her possession. As shown in FIG. 4, the list 152 of power tool devices 104 also indicates a number of power tool devices 104 per category. For example, a user can easily determine how many impact drills are in the inventory and compare that to the number of battery packs compatible with the impact drills. Such easy access to the inventory information may allow the user to make more informed decisions regarding the purchases, maintenance, and general tracking of the power tool devices 104.

As also shown in FIG. 4, the inventory and reporting application also receives other information associated with the power tool devices 104 from the remote server 112. For example, the inventory and reporting application displays an image (e.g., a photograph) of the power tool device, a manufacturer, a description (e.g., what the power tool device is and/or specific characteristics of the power tool device), a model and/or serial number, a specific device number (e.g., a tool number by which the manufacturer identifies the type of power tool device), and a location (e.g., an assigned location, a last known location, a purchase location, etc.). In some embodiments, the inventory and reporting application also receives a customized name for the power tool device 104 (e.g., Bob's Tool) that allows a user to more readily identify the power tool device listed by the inventory and reporting application.

The home screen 148 illustrates the list 152 of the power tool devices associated with the identified user, a search bar 156, a filters option 160, and an add item option 164. The search bar 156 allows a user to search for a particular power tool device by keywords (e.g., impact drill or 18V pack). The filters option 160 allows the user to restrict the display of the power tool devices 104 to only those power tool devices that meet certain criteria. In the illustrated embodiment, a filter can be applied according to a manufacturer, a category, and a location. In other embodiments, other filters can be used in addition or instead of the filters in the illustrated embodiment. In some embodiments, the user can select which filters are available. A user can select the add item option 164 to add a new power tool device 104 to the inventory associated with the identified user.

Figure 5:
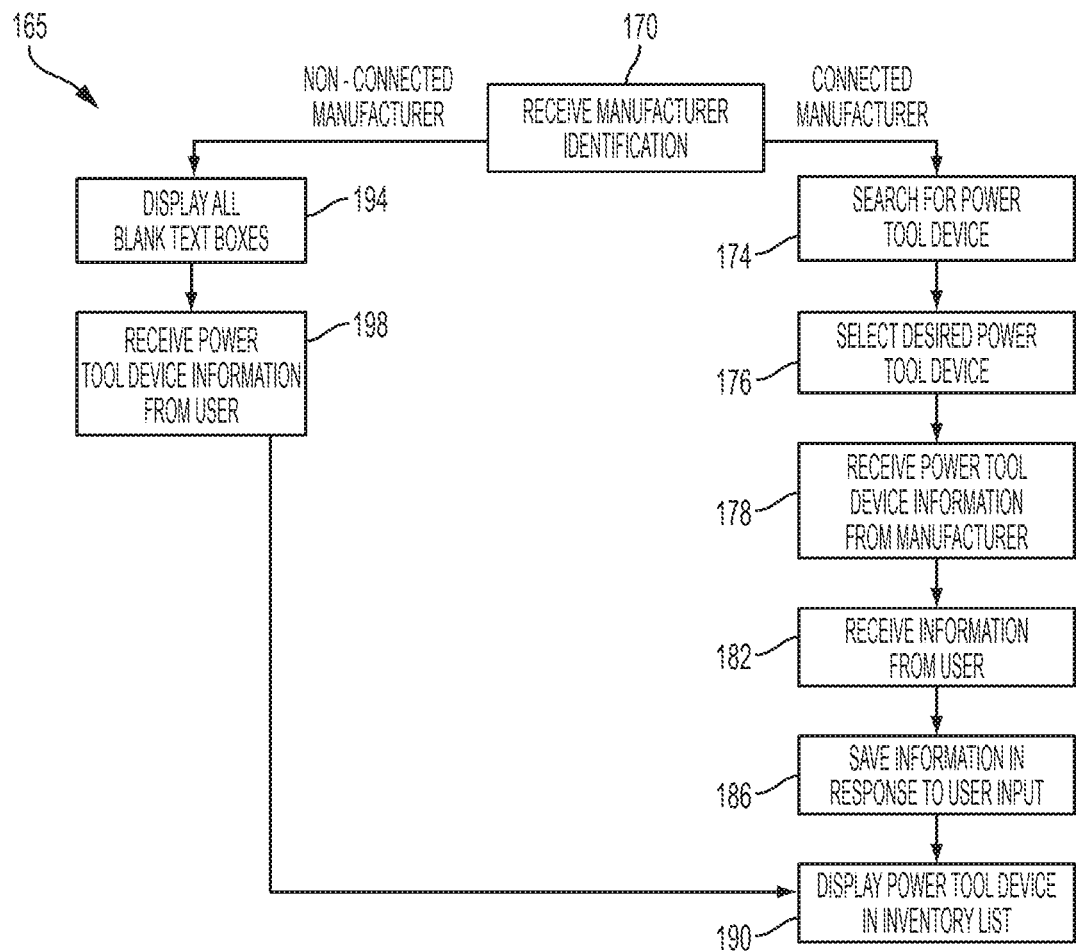
FIG. 5 is a flowchart illustrating a method implemented to add a new power tool device.
Figure 6A:
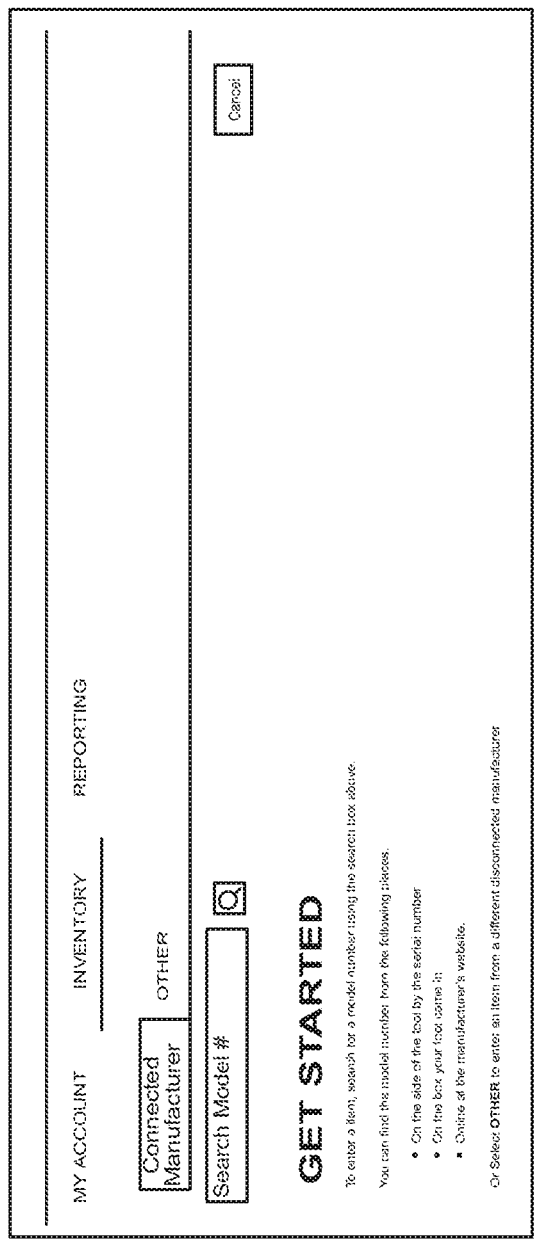
FIGS. 6A-B illustrate exemplary screenshots of pages for adding a power tool device from a connected manufacturer.

FIG. 5 is a flowchart of the process 165 of adding a new power tool device to the inventory using the external device 116. First, the user is requested to identify the manufacturer of the power tool device (step 170). In some embodiments, the user is requested to specify the manufacturer for the power tool device 104. In other embodiments, identifying the manufacturer includes using a particular search box applicable only to some or to one manufacturer. The external device 116 communicates and/or has access to a server associated with at least one manufacturer. If the external device 116 can communicate with the server of a specific manufacturer or a server having power tool device information of the manufacturer (e.g., maintained by a third party), this manufacturer is referred to as a connected manufacturer. If the user adds a power tool device 104 associated with a connected manufacturer, the user searches for a particular tool device 104 using, for example, a tool device number (step 174) as shown in FIG. 6A. The external device 116 (e.g., the inventory and control application) receives a query for a particular power tool device and then communicates with the server of the connected manufacturer to obtain a list of power tool devices matching the search query. The inventory and reporting application then receives power tool device information from the connected server and displays a list of power tool devices to the user on the external device 116. The user can then select the desired power tool device from the search results provided by the inventory and reporting application (step 176). The external device 116 (e.g., the inventory and control application) receives an indication of the user's selection and communicates with the connected server to obtain some of the power tool device information from the manufacturer (step 178). In the illustrated embodiment, the external device 116 obtains an image of the power tool device, a model number, and a description of the power tool device. The external device 116 may also automatically categorize the power tool device based on the information received from the server. In the illustrated example, the power tool device selected to be added to the inventory is an impact driver. Accordingly, the external device 116 categorizes the impact driver under the "Drivers and Impacts" category. In some embodiments, the category to which the power tool device belongs is also communicated from the manufacturer to the external device 116.

Figure 6B:

As shown in FIG. 6B, a user can add further information regarding the selected power tool device 104 (step 182). For example, the user can select a quantity of the same power tool devices that are being added, a purchase location, a value (e.g., purchasing price), a location (e.g., an assigned location for the power tool device), and order and itemization information. Once the user has entered the requested information, or the necessary information, the user can save the entered information by clicking a save button (step 186). After the user has saved all of the entered information for the power tool device 104, the external device 116 displays the new power tool device on the list 152 of power tool devices associated with the identified user (step 190).

In some embodiments, some of the information received by the inventory and reporting application is required to save a new power tool device (e.g., a device number associated with the power tool device), and some of the information is optional (e.g., a customized name for the power tool device). In other words, while a minimum set of information is required to add a new power tool device 104 to the inventory, some of the information is optional and the power tool device can be added with or without the additional information. For example, a user may be required to enter a tool number and a tool name, but may not be required to enter a location and/or purchasing price. In such embodiments, the external unit 116 may receive the required information from the manufacturer server and allow the user to add in any optional information. Such embodiments allow a user to search, select the desired power tool device, and save without further data entry, which makes the process of adding power tool devices 104 to the inventory faster.

Figure 7:
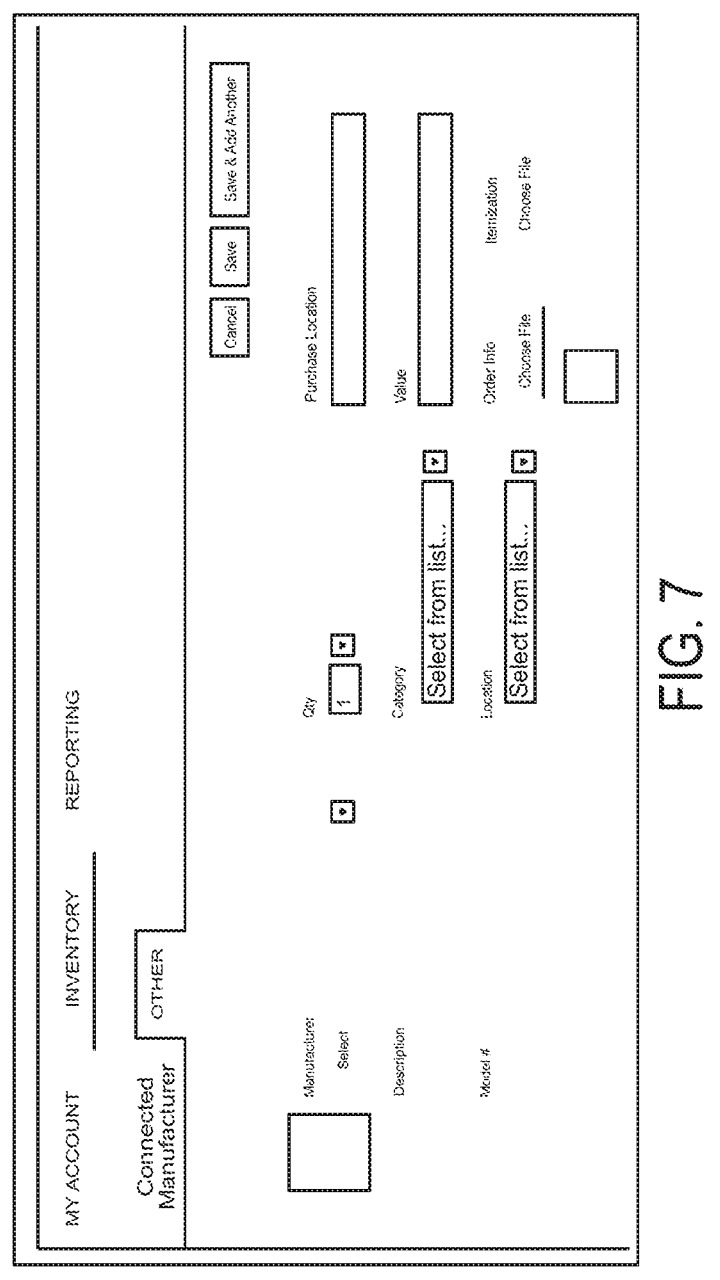

If, on the other hand, the user wishes to add a power tool device from a manufacturer that is not connected to the external device 116 (e.g., power tool device 104*d*), the inventory and control application displays a screen with empty text boxes to be filled by the user (step 194). The user then inputs the information for the power tool device (step 198). Notably, in such embodiments, the external device 116 does not populate the text boxes with information received from the remote server 112. Rather, the text boxes remain blank for the user to fill them in, as shown in FIG. 7. Once the user inputs the information for the power tool device, the user saves the information by, for example, clicking a save button (step 186). The new power tool device is then displayed on the inventory list 152 (step 190).

When the inventory has been altered (e.g., due to an addition of a power tool device and/or due to loss of a power tool device), the inventory and control application on the external device 116 communicates with the server 112 to update the stored information regarding the inventory. The remote server 112 stores the new information for the inventory associated with the user. The next time the user accesses the inventory and reporting application on the external device 116 or on the mobile electronic device 108, the inventory and reporting application would display the most recent inventory information for the user.

Figure 8:
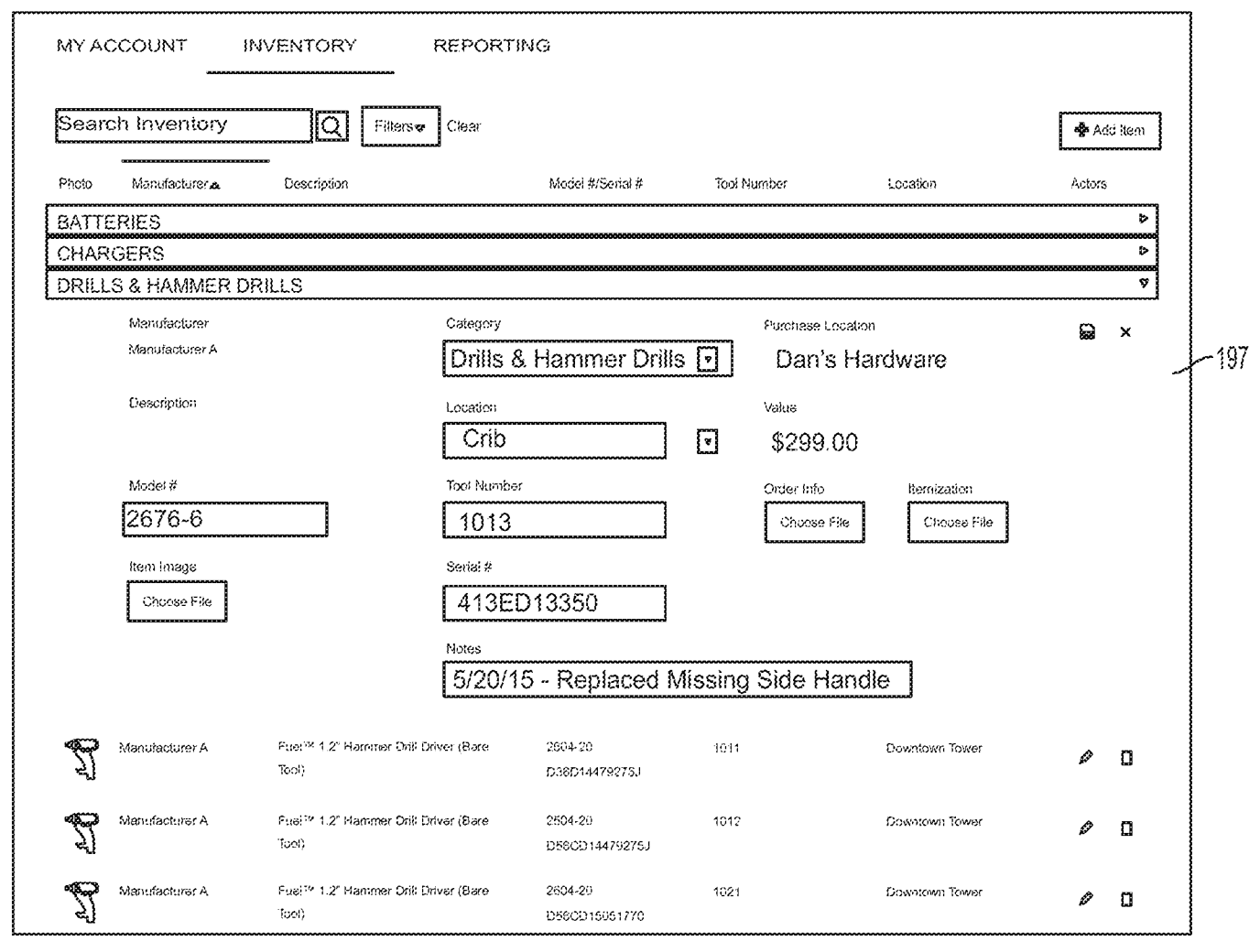

Referring back to FIG. 4, each power tool device 104 also includes an edit icon 195 and a delete icon 196. Even after the power tool device 104 has been added to the user's inventory, a user can edit the information associated with the power tool device 104 by selecting the edit icon 195. When the user selects the edit icon 195, the inventory and reporting application displays an edit screen 197 as shown in FIG. 8. The user can change the category, the location, the tool number, the serial number, the purchase location, the purchase value, and the notes associated with the power tool device. Some of the fields such as, for example, the description or the model number are only editable when other fields such as, for example, the serial number and/or the tool number are changed. In other words, when the serial number and/or the tool number is changed, the description and the model number fields become editable.

A user can alternatively or additionally access the inventory and reporting application via the mobile electronic device 108. For example, a user can add power tool devices to his/her inventory through the mobile electronic device 108. As shown in FIG. 3, the mobile electronic device 108 includes a processor 200, a short-range transceiver 204, a network communication interface 208, a touch display 212, and a memory 216. The processor 200 is coupled to the short-range transceiver 204, the network communication interface 208, the touch display 212, and the memory 216.

The short-range transceiver 204 is configured to communicate with a compatible transceiver within the power tool devices 104a-c. The short-range transceiver 204 can also communicate with other electronic devices. The network communication interface 208 communicates with the network 114 to enable communication with the remote server 112. The communication interface 208 may include circuitry that enables the mobile electronic device 108 to communicate with the network 114. In some embodiments, the network 114 may be an Internet network, a cellular network, another network, or a combination thereof.

Figure 9:
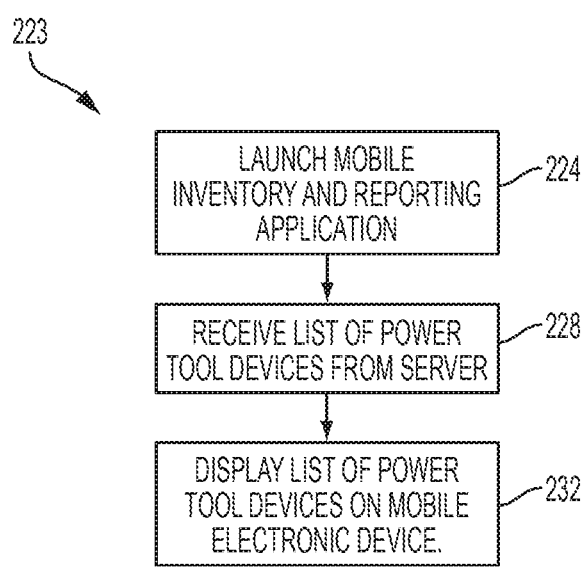
FIG. 9 is a flowchart for the method of launching an application at a mobile electronic station.

The memory 216 of the mobile electronic device 108 also stores core application software 220. FIG. 9 illustrates the process 223 executed by the processor 200 when launching the mobile inventory and reporting application. The processor 200 accesses the core application software 220 in memory 216, and launches a mobile version of the inventory and reporting application (step 224). When the mobile electronic device 108 launches the mobile inventory and reporting application, the mobile electronic device 108 communicates with the remote server 112 to provide a user identification (e.g., username and password). The server 112 accesses the inventory database 113 with the user identification information to generate a list of power tool devices 104 associated with the user, and provides the list of power tool devices 104 to the mobile electronic device 108. The mobile electronic device 108, in turn, receives the list of power tool devices 104 associated with a particular user (step 228). In the illustrated embodiment, the user does not provide a username and password each time the mobile inventory and reporting application is launched. Rather, when an initial install of the mobile inventory and reporting application is performed to download the core application software 220 to the memory 216, a user provides his/her identification information. The mobile inventory and reporting application may then store identification information for the particular mobile electronic device 108 and associate the mobile electronic device with a particular user.

Figure 10:
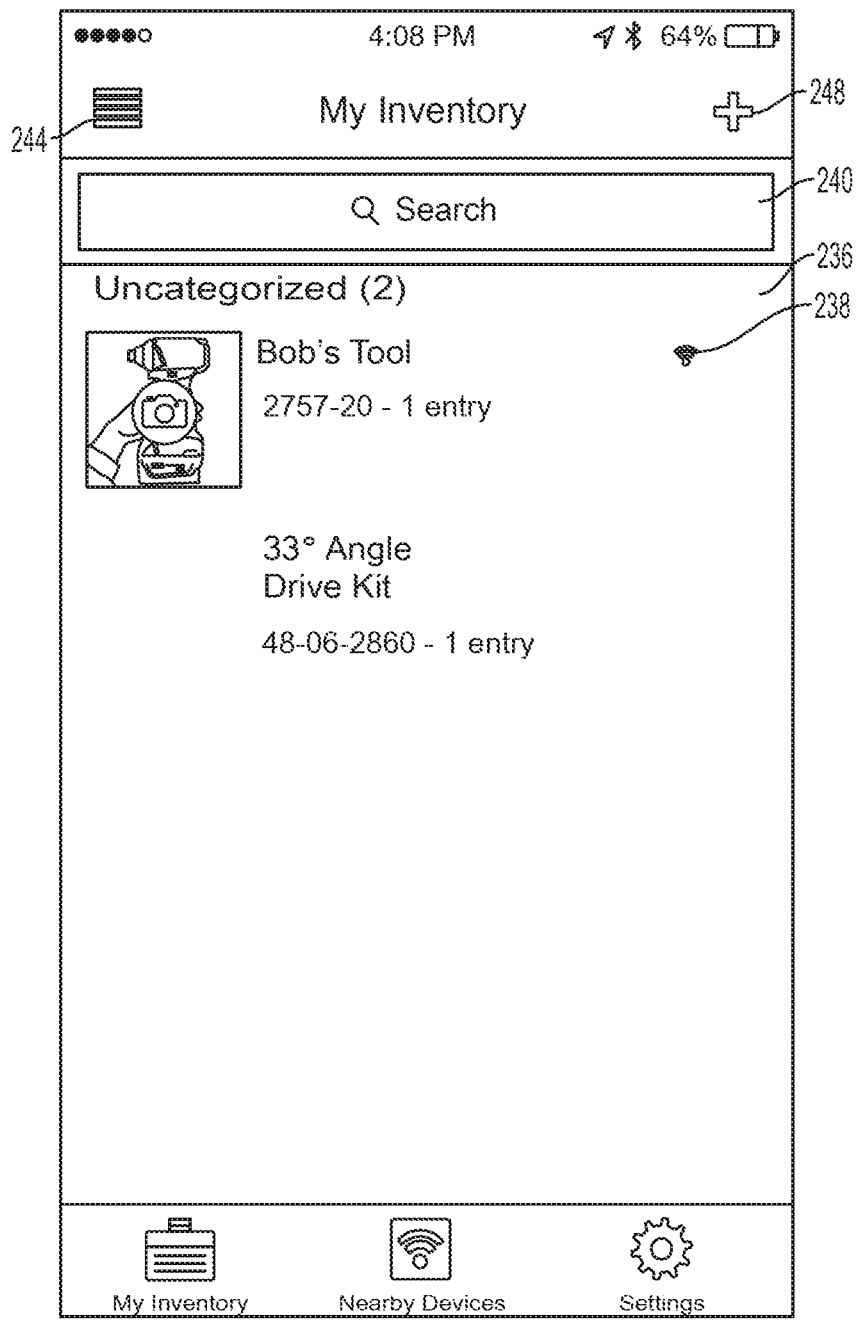
FIG. 10 illustrates an exemplary inventory screen.

Once the mobile electronic device 108 receives the list of power tool devices 104 associated with the user from the server 112, the mobile electronic device 108 displays the list of associated power tool devices on the touch display 212 (step 232). Similar to the list 152 shown in FIG. 4, the mobile electronic device 108 also categorizes the power tool devices to provide the user with readily accessible information regarding the inventory of power tool devices associated with the user, as shown in the exemplary inventory screen 236 in FIG. 10. In the illustrated embodiment, the inventory includes two power tool devices 104 that are uncategorized. As with the external device 116, the mobile electronic device 108 also includes a total count of the power tool devices 104 under any one category. In other embodiments, the inventory may include more or less power tool devices that may be categorized differently.

When the mobile electronic device 108 receives information from the server 112 regarding the power tool devices 104 associated with the identified user, the mobile electronic device 108 also determines the state of the power tool devices 104. The mobile electronic device 108 determines the state or status of the power tool devices 104 based on communication with the power tool devices 104 themselves. The power tool devices 104 can be in a connectable state, an advertisement state, an out of range state, or an unconnectable state. When the power tool device 104 is in the connectable state, the power tool device 104 has sufficient energy (e.g., because the power tool device 104 is connected to a battery pack) to begin data exchange between the power tool device 104 and the mobile electronic device 108. In the connectable state, the power tool device 104 communicates a tool number, a customized name, and an indication that sufficient power for data exchange is available. The inventory and reporting application indicates that the power tool device is in the connectable state by showing a communication symbol 238 next to the power tool device 104. The power tool device 104 is in an advertisement state when the power tool device is not connected to a main power source (e.g., a battery pack) that may provide sufficient energy to sustain data exchange. Rather, in the advertisement state, the power tool device 104 receives power only through the back-up power supply 110. When the power tool device 104 is in the advertisement state, the power tool device 104 does not have sufficient energy to sustain data exchange, but the power tool device 104 communicates the customized name, a tool device number, and/or a state of charge of a secondary battery. The inventory and reporting application indicates that the power tool device is in the advertisement state by graying out or not showing the communication symbol 238 and/or by graying out the power tool device.

When the power tool device 104 is out of range, the inventory and reporting application also show the power tool device 104 grayed out. Finally, when the power tool device 104 is in the unconnectable state, the power tool device 104 is not configured to communicate with the mobile electronic device 108. For example, power tool 104d is not configured to communicate with the mobile electronic device and would therefore be in the unconnectable state. The inventory and reporting application also show unconnectable power tool devices 104 in a grayed out form. In other embodiments, different ways of indicating the status of the power tool devices 104 are implemented. In particular, in some embodiments, each state of the power tool device is illustrated (e.g., using different colors for the symbol 238, showing different symbols, and/or including an information column that explicitly indicates the state of the power tool device 104) differently than another state of the power tool device 104 to readily be able to identify the state of the power tool device 104.

Figure 11:
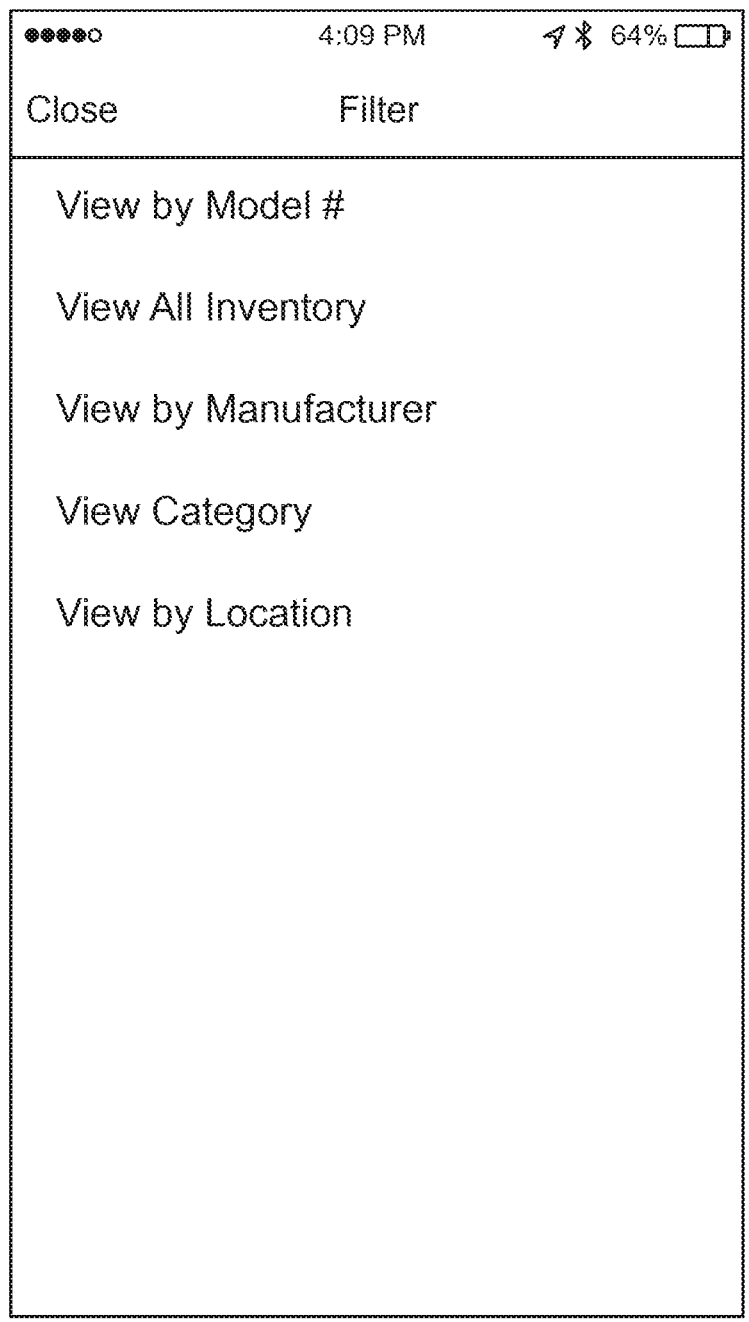
FIG. 11 illustrates an exemplary filters screen.
Figure 12:
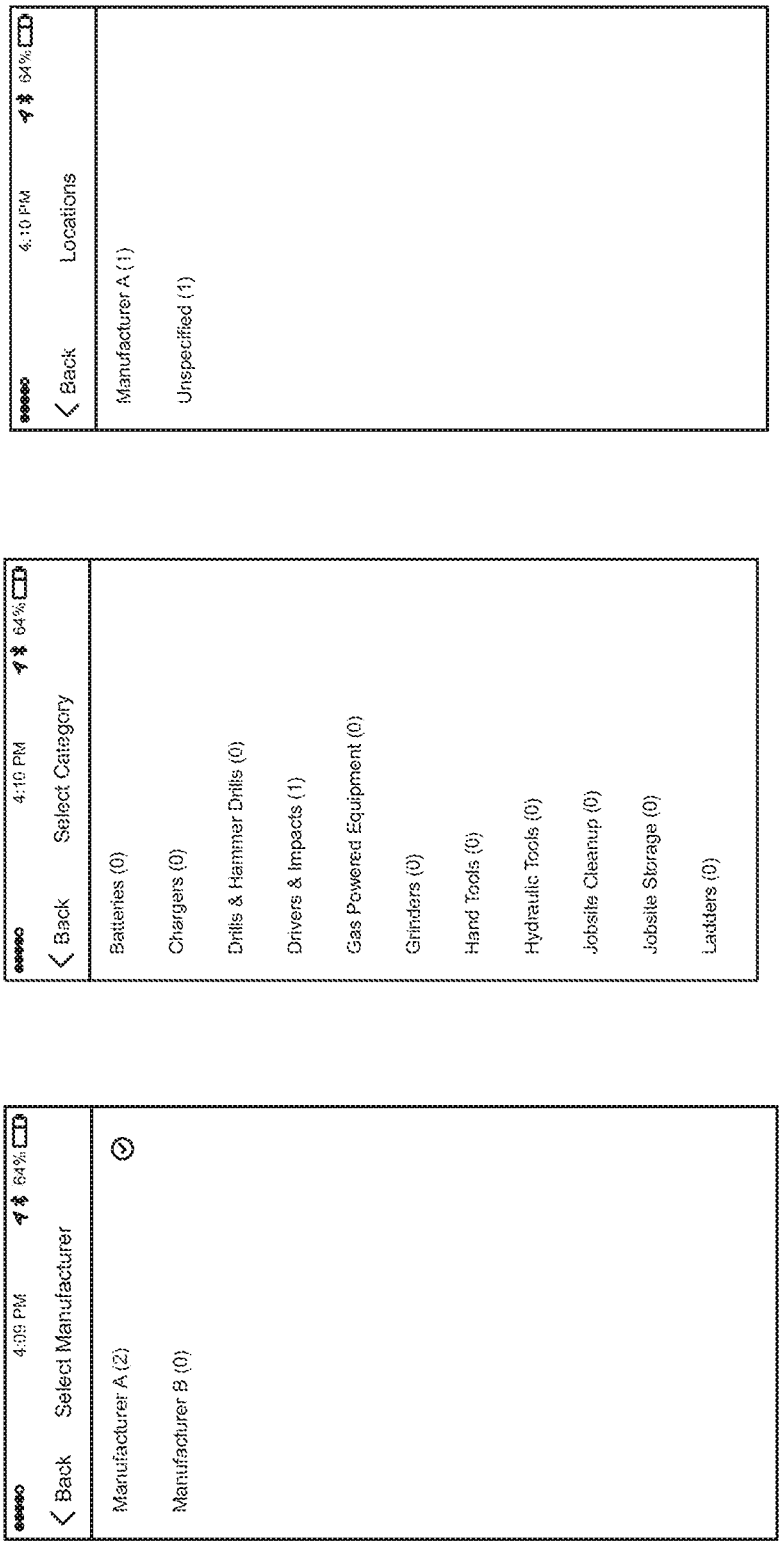
FIGS. 12A-C illustrate exemplary screenshots showing filters that can be applied on an inventory and reporting application.

The inventory screen 236 includes a search box 240, a menu option 244, and an add item option 248. The search box 240 allows a user to search within his/her inventory for a particular tool using keywords. The keywords may be associated with a customized name of the power tool, a description of the power tool, a location, a model or serial number, etc. The menu option 244 may allow the user to select how to display the list of associated power tool devices 104. For example, the menu option 244 may allow the user to display the power tool devices according to the location, the manufacturer, etc. As shown in FIG. 11, the menu option 244 may allow the user to set different filters to display only a portion of the associated power tool devices. In the illustrated embodiment, the user may set filters according to manufacturer (see FIG. 12A), category (see FIG. 12B), location (see FIG. 12C), etc.

Figure 13:
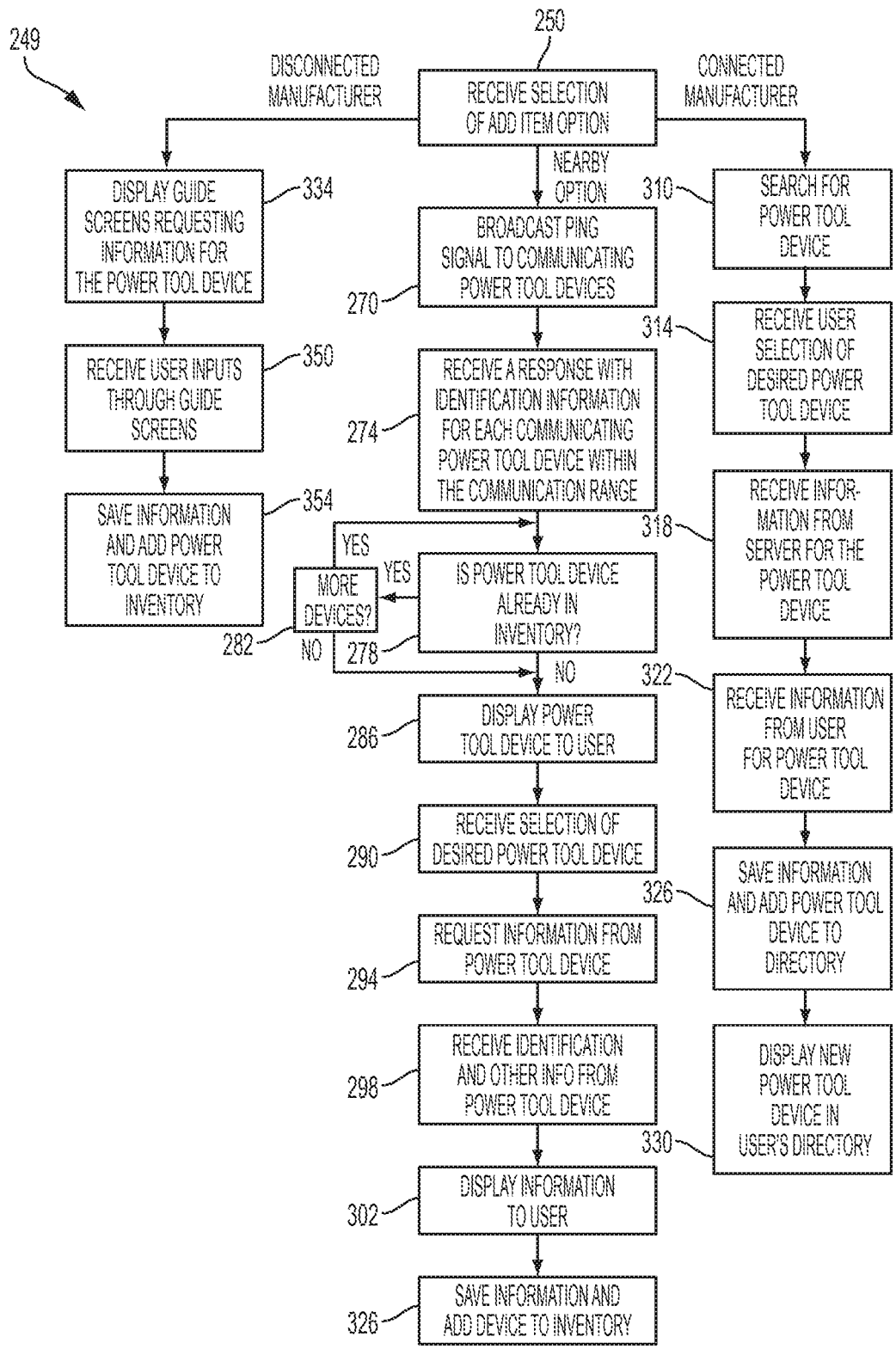
FIG. 13 is a flowchart illustrating a method of adding a new power tool device on a mobile electronic device.
Figure 14:
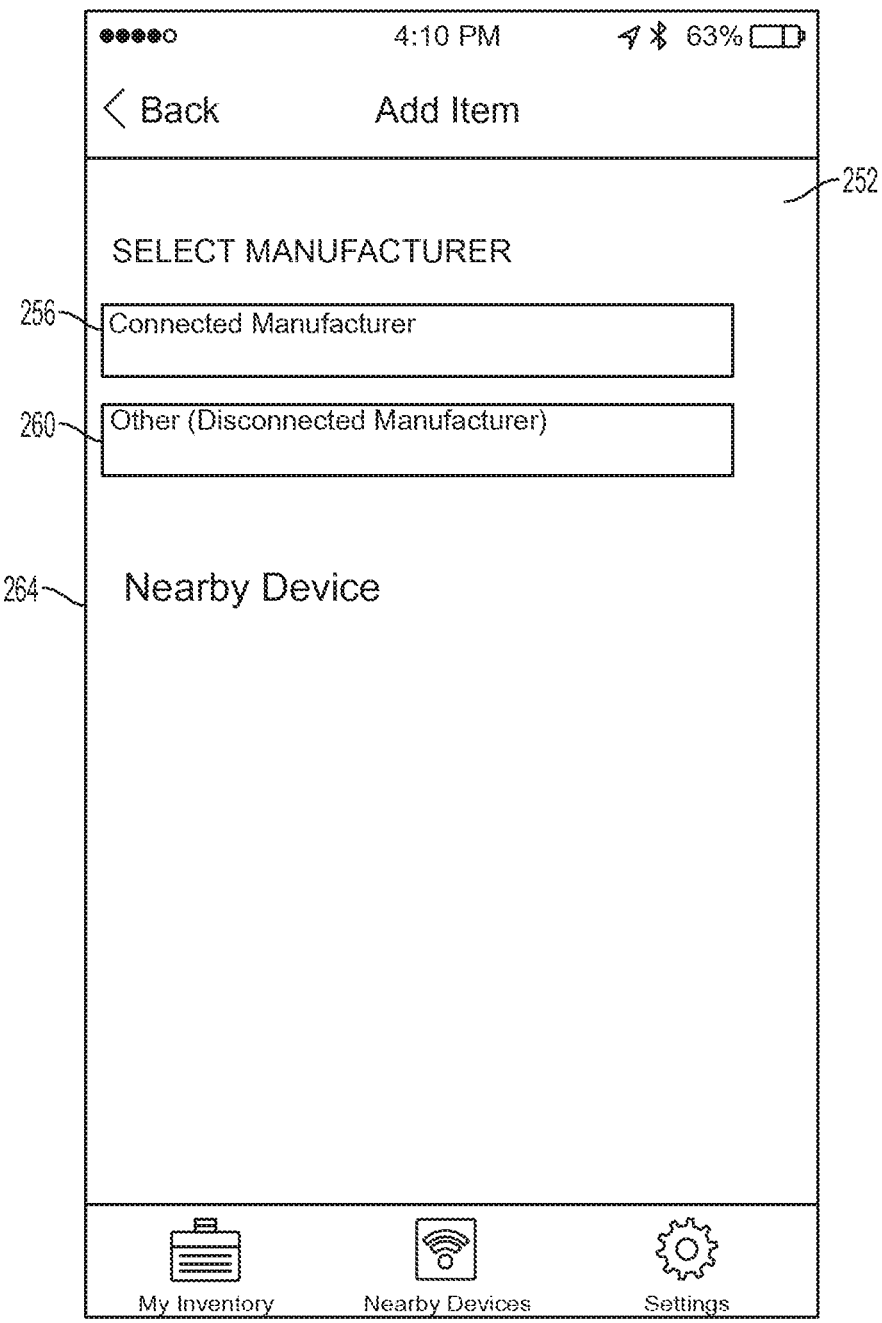
FIG. 14 illustrates an exemplary screen to add a power tool device.

The user may select the add item option 248 to add a power tool device to his/her inventory through the mobile inventory and reporting application. FIG. 13 illustrates the process 249 of adding a new power tool device using the mobile electronic device 108. First, the user selects the add item option 248 from the inventory screen 236 (step 250). In response to the selection of the add item option 248, the mobile electronic device 108, in particular the inventory and reporting application, displays an add item screen 252 as shown in FIG. 14. The add item screen 252 provides the user two methods for adding a new power tool device. The user can identify the manufacturer of the power tool device 104 similar to how a manufacturer was identified through the external device 116 (options 256 and 260), or the user can add a communicating power tool device 104 that is nearby by establishing communication with the nearby power tool device 104 (option 264).

When the user wishes to add a nearby power tool device 104, the user selects the nearby device option 264. In response to receiving the nearby device option 264, the mobile inventory and reporting application broadcasts a ping signal from the mobile electronic device 108 to the power tool devices within the communication range of the mobile electronic device 108 (step 270). Only those power tool devices 104 that are within the communication range of the mobile electronic device 108 and that are configured to communicate wirelessly with the mobile electronic device 108 (e.g., the communicating power tool devices 104a-c) respond to the ping signal from the mobile electronic device 108. The inventory and reporting application then receives responses from the communicating power tool devices 104a-c within the communication range (step 274). The responses from the communicating power tool devices 104a-c include identification information for each power tool device. The identification information includes, for example, a customized name associated with the power tool device, a model number, a unique identifier, a tool number, etc. In some embodiments, the power tool devices 104 periodically broadcast the identification information for the power tool device 104 without requiring a ping signal from the mobile electronic device 108 to be received. In such embodiments, step 270 in which the mobile electronic device 108 sends a ping signal to the power tool devices 104 nearby is bypassed.

The inventory and reporting application then compares the received responses to the power tool devices already in the inventory (step 278). If a received response corresponds to a power tool device 104 that is already part of the inventory, the inventory and reporting application does not display that power tool device 104 to the user and continues to check the rest of the responses (step 282). If, on the other hand, the received response corresponds to a power tool device 104 that is not part of the inventory, the inventory and reporting application displays the power tool device 104 to the user (step 286). Thereby, the inventory and reporting application only displays those power tool devices 104 that are nearby and that are not already part of the inventory for the user.

Figure 15:
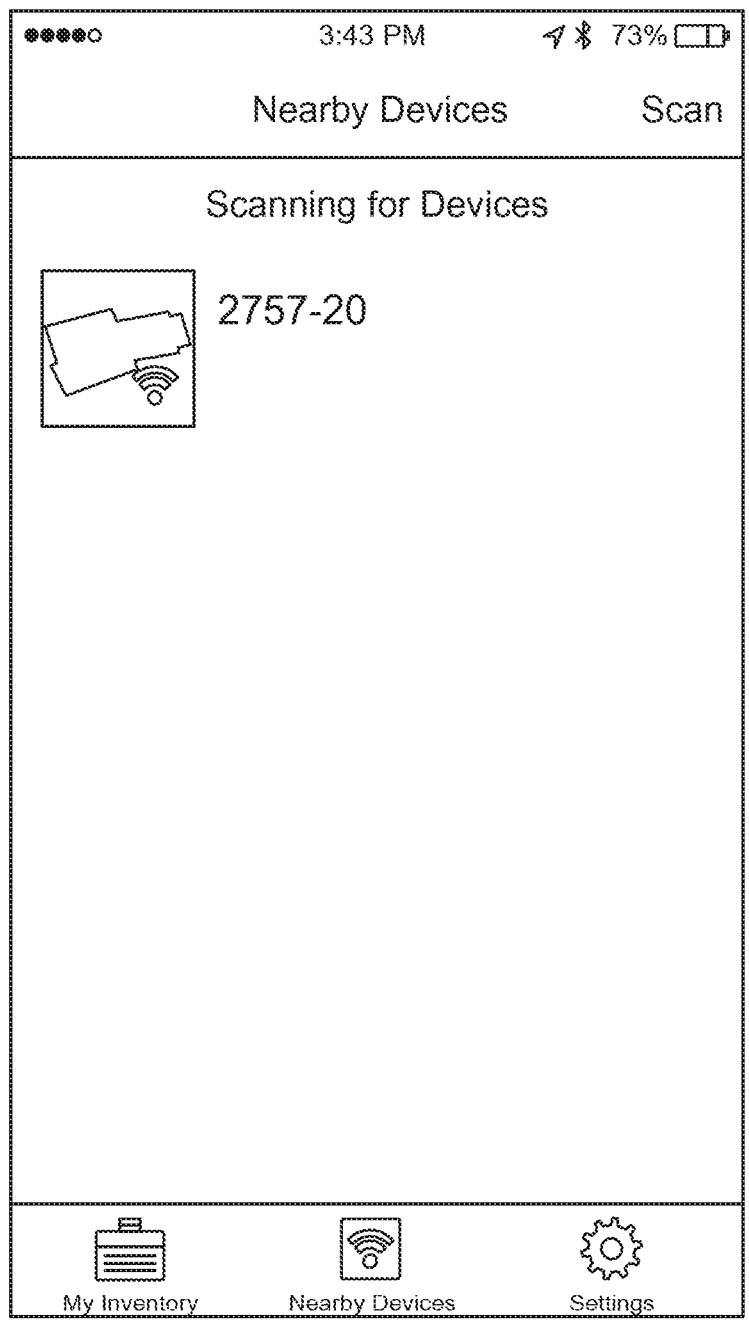
FIG. 15 illustrates an exemplary list of nearby power tool devices that are not in the inventory.
Figure 16:
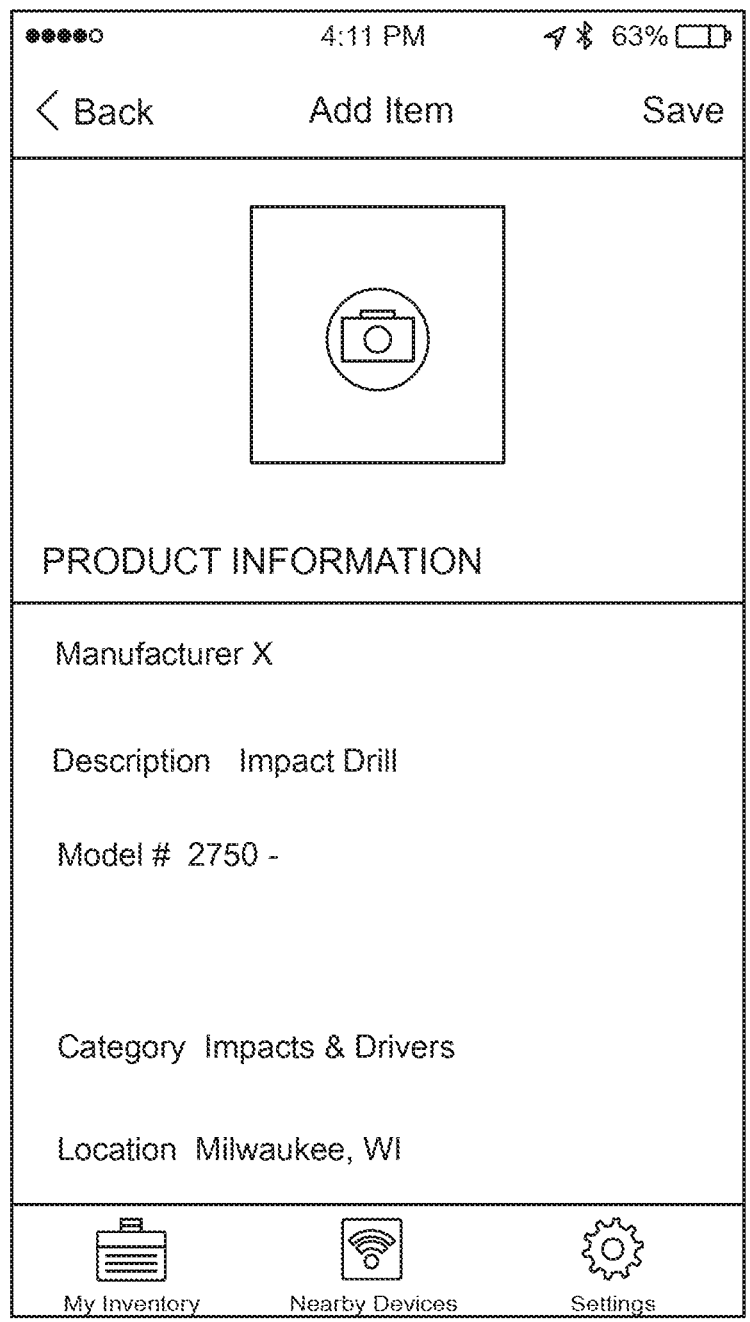
FIG. 16 illustrates an exemplary screen including information received from a communicating power tool device.

FIG. 15 illustrates a list generated by the inventory and reporting application that identifies the power tool devices that are nearby and not yet part of the user's inventory. The user can then select the new power tool device 104 that he/she wishes to add to his/her inventory (step 290). The mobile electronic device 108 then communicates with the selected communicating power tool device 104a-c to obtain information for the selected communicating power tool device 104a-c (step 294). The communicating power tool device 104a-c then forwards identification and other information to the mobile electronic device 108 to add the selected communicating power tool device 104a-c to the user's inventory (step 298). The mobile inventory and reporting application, upon receipt of the identification and other information from the communicating power tool device 104a-c, displays the received information to the user as shown in FIG. 16 (step 302). The user can verify the information received from the selected communicating power tool device 104a-c, and click save. The mobile inventory and reporting application then saves the received information and adds the power tool device to the user's inventory (step 326). If the information received from the power tool device is not complete (e.g., the power tool device 104 may not communicate a category), the user can add and/or edit information received from the communicating power tool device. In some embodiments, the identification information provided in step 274 is sufficient to generate a new entry (i.e., add the power tool device 104) to the user's inventory, and steps 294-302 are bypassed.

Enabling the user to add power tool devices that are nearby saves a significant amount of time because the user no longer has to manually search for a particular power tool device, input necessary information, etc. Instead, the mobile inventory and reporting application automatically determines which of the nearby power tool devices 104 are not yet part of the user's inventory and requests information for the inventory from the power tool devices 104 directly.

Figure 17:
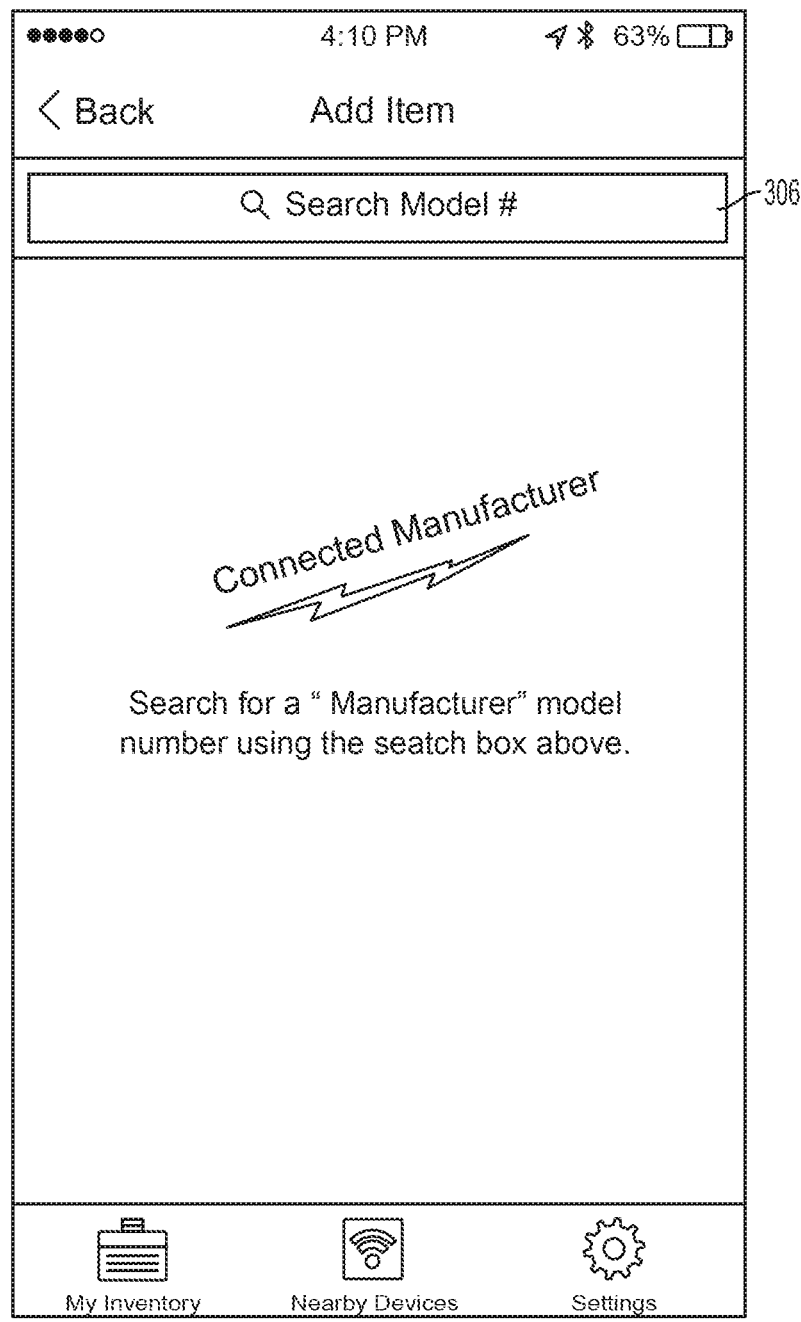
FIG. 17 illustrates an exemplary screen to search for a power tool device from a connected manufacturer.

Referring back to FIG. 13, the user can alternatively choose to add a power tool device 104 without using the nearby device option 264. Rather, the user can add a power tool device 104 from a connected manufacturer by selecting the connected manufacturer option 256. In response to detecting the selection of the connected manufacturer option 256, the inventory and reporting application (e.g., the processor executing the core application software) displays a search bar 306 (FIG. 17). The user then searches for the desired power tool device using a model number, serial number, tool number, etc. (step 310). The mobile electronic device 108 communicates with the remote server 112. The remote server 112 communicates with a server associated with the connected manufacturer. Based on the search criteria from the user, the mobile electronic device 108 receives a set of search results including various power tool devices. The user then selects the desired power tool device from the search results (step 314). The mobile electronic device 108 then communicates the user's selection to the remote server 112 and receives information regarding the selected power tool device from the remote server 112 (step 318). The mobile electronic device 108 populates text boxes or selections with the information received from the remote server 112.

The user can then add more information regarding the selected power tool device 104, if the user, for example, wishes to input more information or additional notes (step 322). When the information has been gathered regarding the new power tool device 104, the user selects a "save" option, and the inventory and reporting application saves the information and adds the new power tool device to the user's inventory (step 326). The inventory and reporting application then displays the new power tool device 104 as part of the list 152 of power tool devices in the user's inventory (step 330).

Figure 18A:
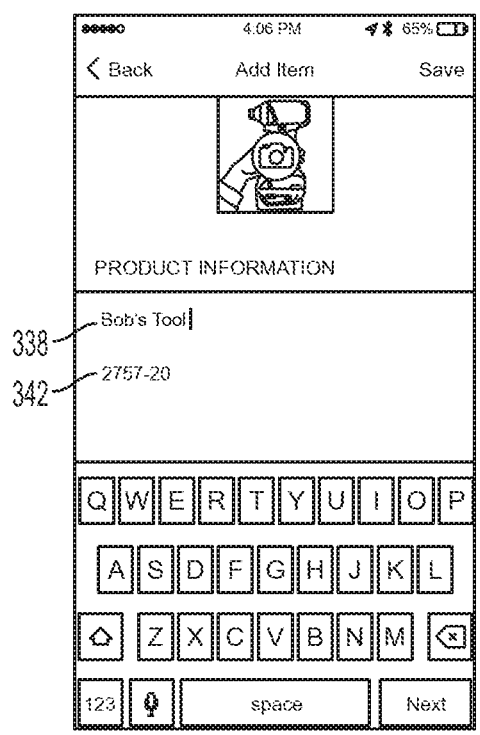
Figure 18B:
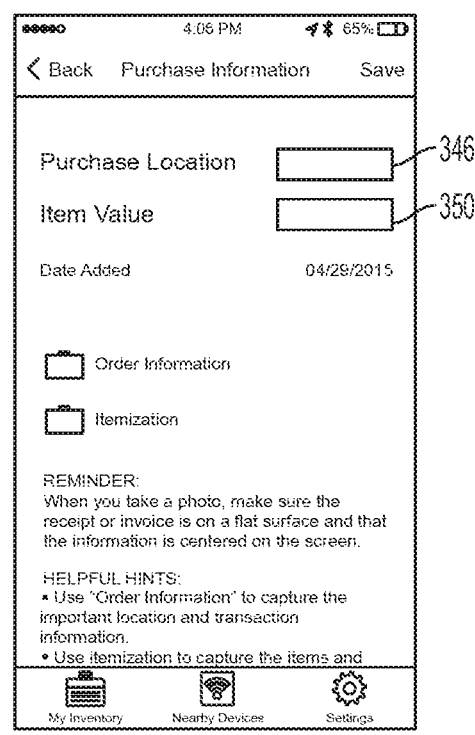
Figures 18C, 18D, 18E:
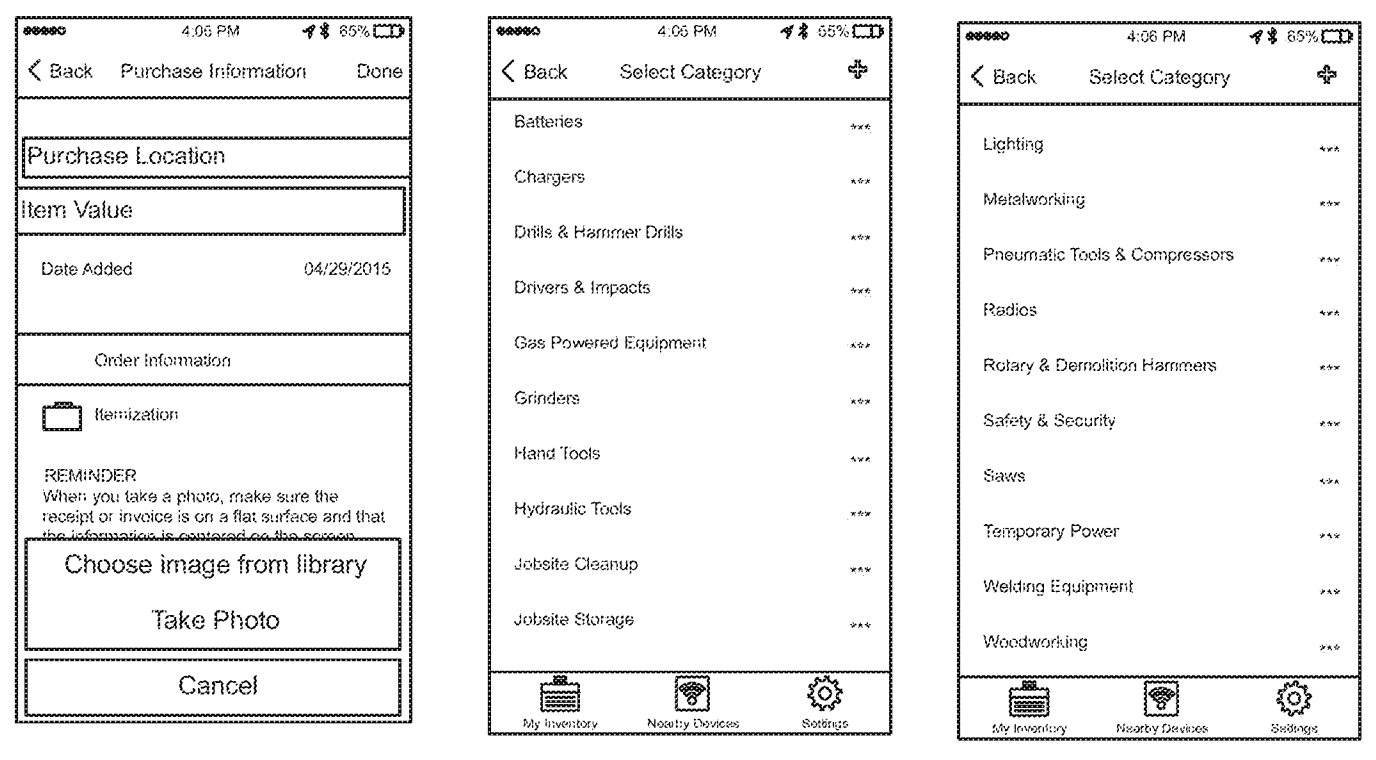
Figure 18F:
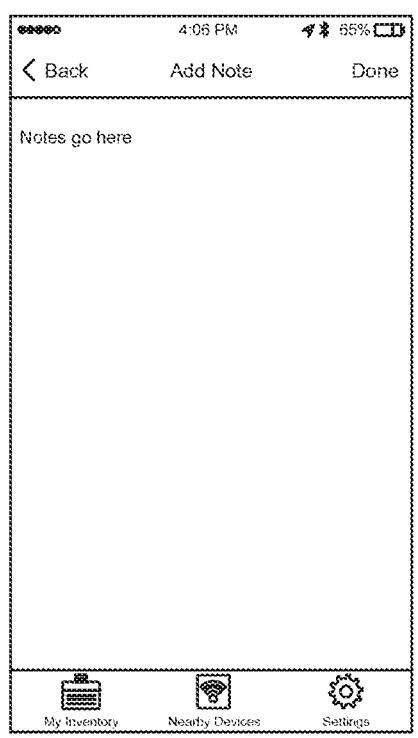
Figure 18G:
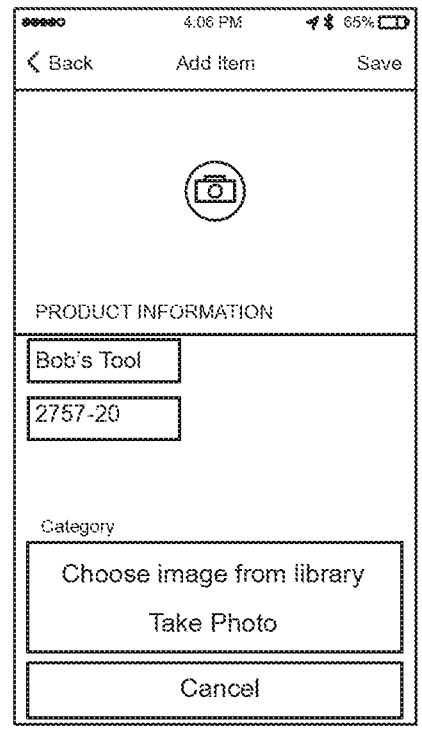

Referring back to FIG. 13 again, the user can alternatively select to add a power tool device from a disconnected manufacturer by selecting the disconnected manufacturer option 260 (FIG. 14). In response to detecting that the user selected the disconnected manufacturer option 260, the inventory and reporting application guides the user by displaying various guide screens shown in FIGS. 18A-G for the user to input information regarding the new power tool device (step 334). The inventory and reporting application receives information such as a name 338 for the power tool and the tool number 342 (FIG. 18A), purchase information such as, for example, purchase location 346, a value (e.g., price) 350 (FIGS. 18B-C). When entering purchase information, the user can also take a picture of, for example, a purchase order or a purchase receipt and save the image under the purchasing information for that power tool device 104 (FIG. 18C). The inventory and reporting application also receives an indication of the category for the power tool device 104 (FIGS. 18D-E). The user can also incorporate other notes for the power tool device 104 (FIG. 18F) and take a picture of the power tool device 104 to readily identify it (FIG. 18G). Once the user inputs the information regarding the new power tool device 104, the inventory and reporting application saves the information and adds the power tool device 104 to the user's inventory (step 354).

Figures 19A, 19B, 19C:
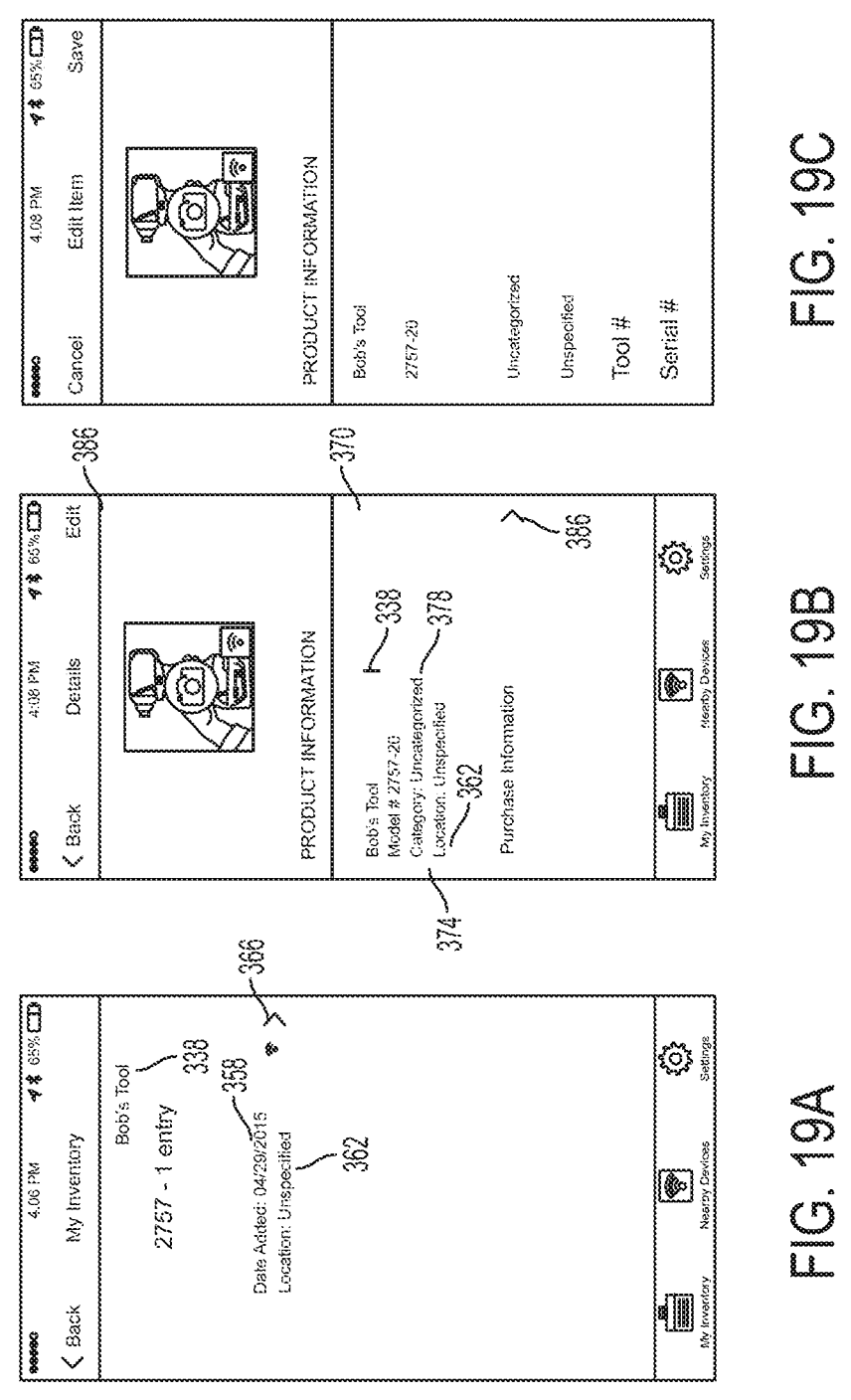

Once the power tool devices 104 have been added to the user's inventory, the power tool devices are displayed as part of the user's inventory. Referring back to FIG. 10, a user can select each power tool device 104 in his/her inventory and view/edit information regarding the power tool device 104. For example, as shown in FIGS. 18A-F, the user can edit the information associated with a power tool device 104 already part of the inventory. In the illustrated embodiment, the user selects a power tool device 104 (e.g., Bob's Tool). In response to the user selection of the power tool device 104, the inventory and reporting application shows limited information regarding the power tool device 104. For example, as shown in FIG. 19A, the mobile inventory and reporting application display the name 338 of the power tool device, the date 358 the power tool device was added, and the assigned or current location 362 of the power tool device. As shown in FIG. 19A, the user can select to see more information associated with the selected power tool device by selecting the arrow 366 in FIG. 19A. In other embodiments, the inventory and reporting application may use different symbols and icons to indicate that more information is available to the user.

In response to selecting the arrow 366, the inventory and reporting application displays a product information screen 370 for the selected power tool device as shown in FIG. 19B. The product information screen 370 provides a summary of the product information associated with a selected power tool device 104. In the illustrated embodiment, the product information screen 370 includes information regarding the power tool device name 338, the model number 374, the assigned category 378, the assigned location 362, and an option to view more purchase information 382. The product information screen 370 also includes an edit selector 386 that enables the user to edit the information associated with the power tool device 104.

Figures 19D, 19E, 19F:
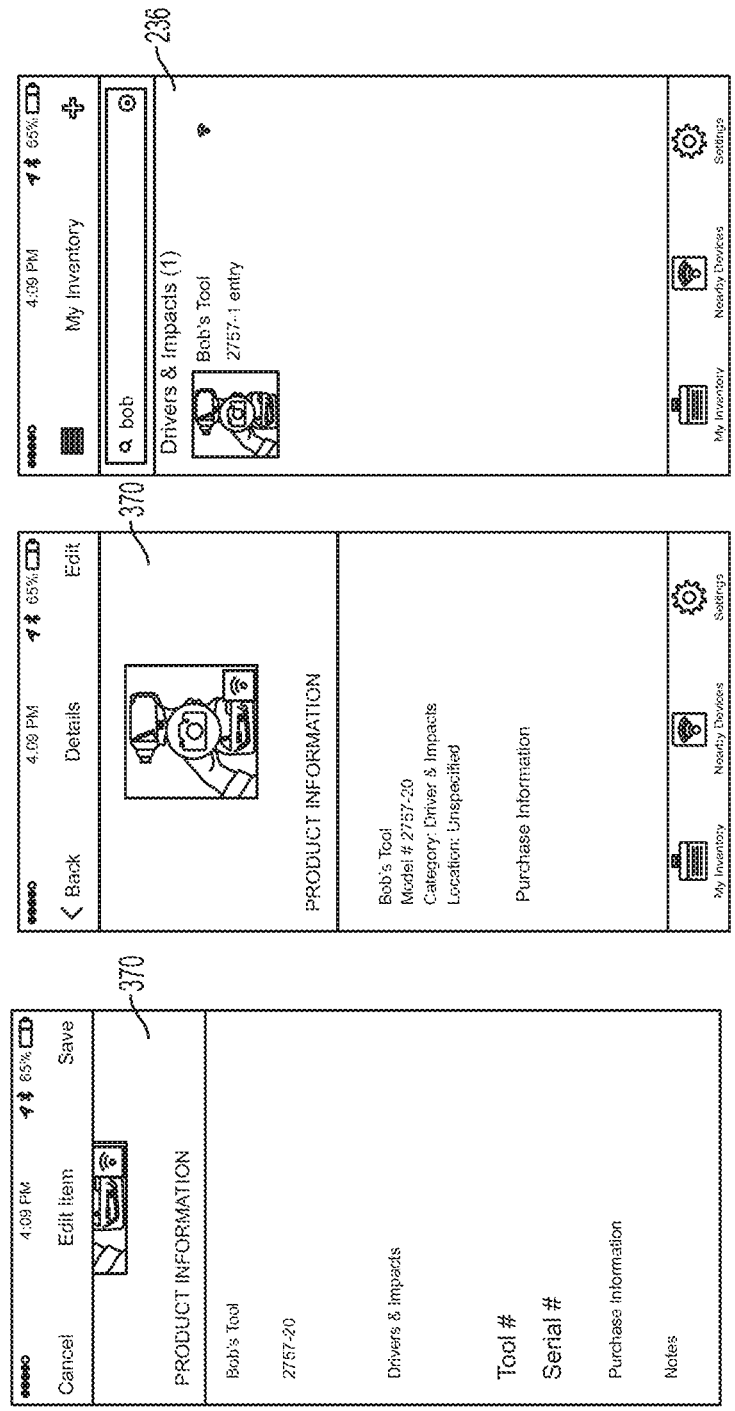

In the illustrated embodiment, the selected power tool device (e.g., Bob's Tool) does not include information regarding the category 378 of power tool device and the location 362 of the power tool device. The user then selects the edit selector 386 to add in a category and a location for the power tool device (e.g., Bob's Tool). In response to detecting that the user clicked on the edit selector 386, the mobile inventory and reporting application displays an editable version of the product information screen 370. As shown in FIG. 19C, a user can then edit the information associated with the power tool device. In the illustrated example, the user specifies a category 378 and a location 362 for the power tool device, as shown in FIG. 19D. Once the user has edited the desired information for the power tool device, the user can select "save" to finalize editing the power tool device information. FIG. 19E shows an updated version of the product information screen 370 with the edited information included (e.g., the category 378 and the location 362). FIG. 19F illustrates an updated version of the inventory screen 236 showing the edited power tool device (e.g., Bob's Tool) under a different category.

Executing the inventory and reporting application on the mobile electronic device 108 also provides other features such as tool device attendance, inventory sectioning, and location tracking. Tool device attendance is a feature that allows users to determine whether the tool devices 104 in his/her inventory are within a communication range of the mobile electronic device 108, thus allowing a user to quickly identify whether power tool devices 104 are missing and if so, which ones.

Figure 20:
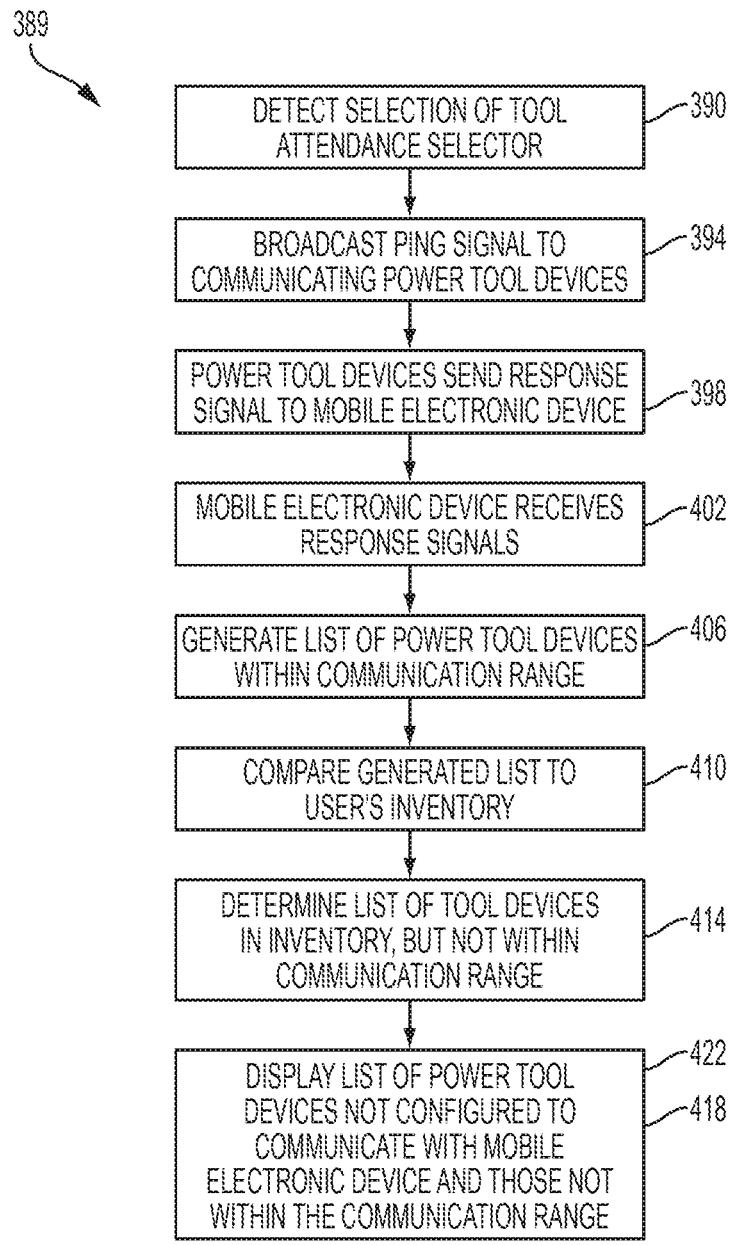
FIG. 20 is a flowchart illustrating a method for implementing a tool attendance feature.

FIG. 20 illustrates a flowchart of a method 389 implementing tool device attendance. From the inventory screen 236, the user can select a "tool attendance" selector (step 390). In response to the user selecting the "tool attendance" selector, the mobile inventory and reporting application broadcasts a ping signal to the communicating power tool devices 104a-c (step 394). The communicating power tool devices 104a-c, in response to the ping signal, send a response signal to the mobile electronic device 108 (step 398). The mobile electronic device 108 then receives the response signals from each of the communicating power tool devices 104a-c that are within the communication range of the mobile electronic device 108 (step 402). In some embodiments, the power tool devices 104 periodically broadcast identification information for the power tool deice 104 without requiring a ping signal from the mobile electronic device 108. In such embodiments, the mobile electronic device 108 detects which power tool devices 104 are nearby based on the broadcast signals from the power tool devices 104.

The mobile inventory and reporting application then generates a list of the power tool devices 104 that sent a response signal (or those that broadcasted the power tool device identification information) to the mobile electronic device 108 (step 406). The mobile inventory and reporting application compares the list of power tool devices 104 that sent a response signal to the power tool devices 104 that are part of the user's inventory (step 410). Based on the comparison of the two lists, the mobile inventory and reporting application determines which power tool devices 104 from the user's inventory are not within a communication range of the mobile electronic device 108 (step 414). The mobile inventory and reporting application displays a list of the "missing" power tool devices to the user (step 418). Since the user's inventory may also include power tool devices that do not communicate wirelessly with the mobile electronic device 108 (e.g., power tool 104d), the inventory and reporting application also displays a list of the power tool devices 104 that are not configured to communicate with the mobile electronic device 108 (step 422). The inventory and control application can also display, in response to a user selection, a separate list of these power tool devices 104 that were found.

The user can determine, based on the list provided by the inventory and reporting application, how many power tool devices 14 are missing and which power tool devices 104 are missing. The user can also delete these power tool devices 104 from the inventory, or edit the information associated with these power tool devices 104. The tool attendance feature can be implemented, for example, at the beginning of the work day to establish which tools are present at the particular worksite, at the end of the work day to ensure that the tools which were present at the beginning of the day are returned at the end of the day, and when transporting tools from one jobsite to another to ensure that the power tool devices 104 were delivered to the appropriate jobsite. The user can also save an attendance log including a time, date, and location stamp. The attendance log includes a listing of the power tool devices 104 that were nearby (e.g., found), and a separate listing the power tool devices 104 that were in the user's inventory, but were not nearby (e.g., missing).

Figure 21:
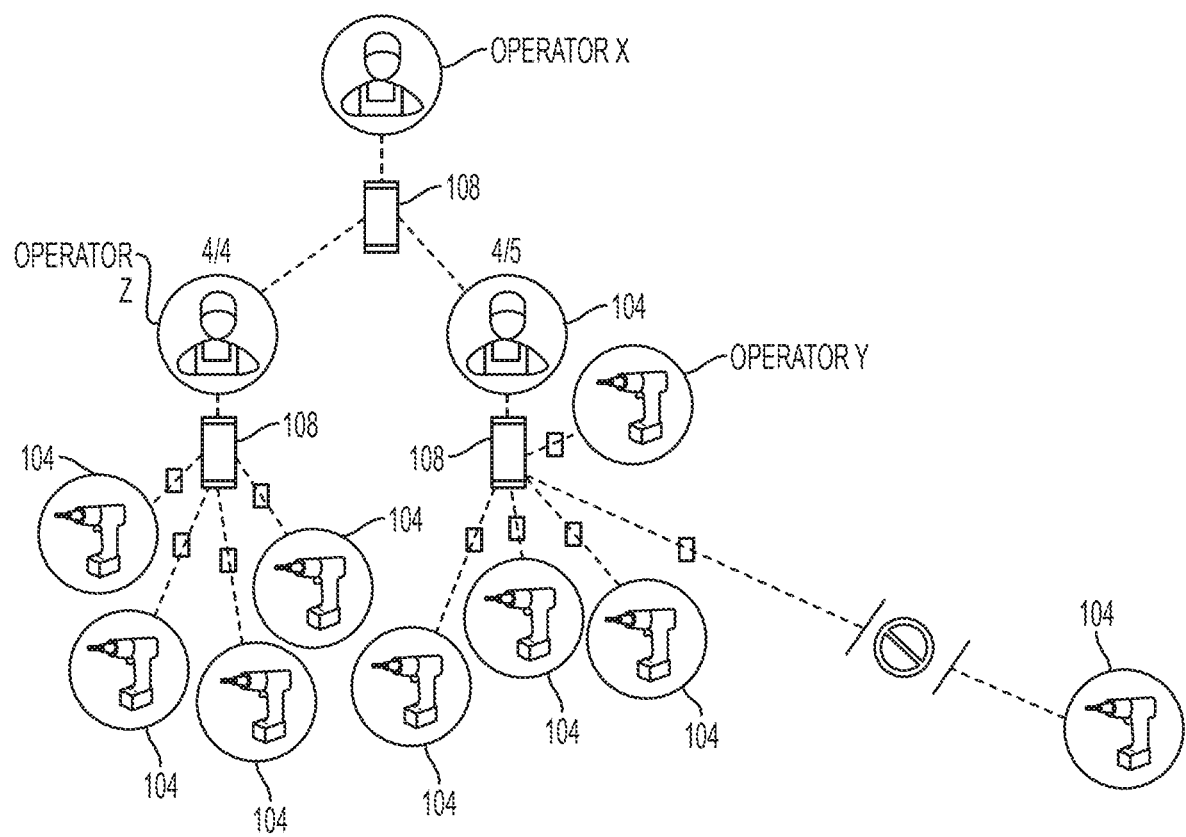
FIG. 21 illustrates a schematic diagram illustrating the concept of inventory sectioning.

Running the inventory and reporting application on the mobile electronic device 108 also enables inventory sectioning. While a large entity (e.g., a contracting company) may have too many power tool devices for a mobile inventory and reporting application to conveniently track, an administrator can divide and assign particular power tool devices 104 to particular users (e.g., operators, foreman, crib manager, etc.). The administrator (e.g., a buyer) can run the inventory and reporting application on the external device 116 displaying the power tool devices 104 owned by the large entity. However, to accurately and efficiently track the power tool devices 104, the administrator may separate the power tool devices 104 into subsets, as illustrated in FIG. 21. Each jobsite, for example, may be assigned a particular set of power tool devices 104. A user (e.g., a foreman or crib manager) at the jobsite may manage the inventory of the power tool devices 104 within the jobsite. The user at the jobsite may not have access to the other power tool devices 104 that are owned by the large entity. Rather he/she can focus on the present jobsite and on efficiently managing the power tool devices 104 within that jobsite. For example, operator X has sub-inventory including all tools shown in FIG. 21. Operator Y has sub-inventory including the tools shown as connected via dashed lines to operator Y's mobile device 108. Operator Z has sub-inventory including the tools shown as connected via dashed lines to operator Z's mobile device 108.

Figure 22:
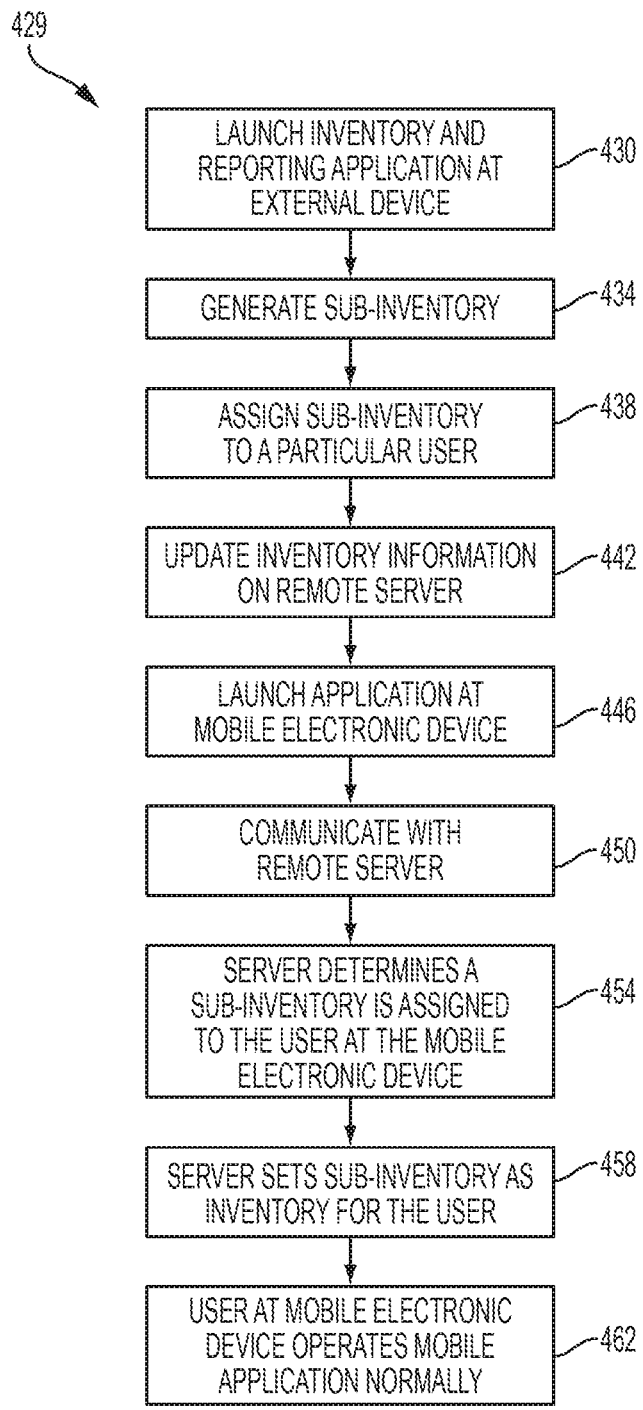
FIG. 22 is a flowchart illustrating a method for implementing an inventory sectioning feature.

FIG. 22 is flowchart illustrating an exemplary method 429 of sectioning a large inventory. First, an administrator at the external device 116 launches the inventory and reporting application (step 430). The administrator at the external device 116 generates a sub-inventory based on the entire inventory (step 434). The inventory and reporting application at the external device 116 generates the sub-inventory by grouping specific power tool devices 104 together in response to receiving a selection from a user of some power tool devices 104. The sub-inventory is assigned a name so that the user can identify and distinguish each sub-inventory from other sub-inventories. The inventory and control application then assigns the sub-inventory to a particular user (step 438), based on the administrator identifying the user for the sub-inventory. Once the inventory and reporting application generates the sub-inventory and assigns the sub-inventory to a particular user, the external device 116 communicates with the remote server 112 to update the inventory information (step 442). The server 112 stores the sub-inventory and the user to which it is assigned. A user at the mobile electronic device 108 then launches the mobile inventory and reporting application (step 446). When the mobile inventory and reporting application is launched, the mobile electronic device 108 communicates with the remote server 112 to identify the user associated with the mobile electronic device 108 (step 450). The server 112 then determines that the user associated with the mobile electronic device 108 is the same as the user to which the sub-inventory is assigned (step 454). The server 112 then sets the sub-inventory as the inventory for the user (step 458). The user interacts with the mobile inventory and reporting application as described previously, being able to add power tool devices 104 to the sub-inventory, edit information of the power tool devices 104 in the sub-inventory, etc. (step 462).

Launching the inventory and reporting application on the mobile electronic device 108 also allows for location tracking of the power tool devices 104. As discussed above, each of the power tool devices 104 is associated with a location. The location is an assigned location (e.g., where the power tool device is supposed to be). If a transfer of power tool devices 104 is desired, a user can use the inventory and reporting application to change the assigned location to track where the power tool device 104 is being transported. The inventory and reporting application can also save, display, and output information regarding a particular power tool device's location history. In other words, a user may determine where the power tool device has been before and may be able to better determine a probable location for the power tool device if, for example, the power tool device 104 is misplaced.

For example, the location tracking would also enable a user at the external device 116 to determine that power tool devices 104 are to be transported from jobsite A to jobsite B. The users at both jobsite A and jobsite B may be notified via communication from the remote server 112 that at least some of the power tool devices 104 from jobsite A are to be transported to jobsite B. A user at jobsite A may then arrange for the transportation of the power tool devices 104 according to the received notification.

In the illustrated embodiment, when a user launches the mobile inventory and reporting application at the mobile electronic device 108, the inventory and reporting application also indicates the status of each of the power tool devices 104 to the user. The power tool devices 104 may be in an advertisement state in which the power tool device 104 provides minimal identification information, but may not engage in further electronic data transfer between the power tool device 104 and the mobile electronic device 108. The power tool devices 104 may alternatively be in the connectable state in which the power tool device 104 provides identification information and may readily engage in electronic data transfer between the power tool device 104 and the mobile electronic device 108. Additionally, the mobile inventory and reporting application may indicate when a power tool is in use.

The inventory and reporting application also allows a user to analyze the operation of a particular power tool device and generate technical reports regarding the operation of the power tool device 104 or a group of power tool devices 104. In the illustrated embodiment, the operation of a hydraulic crimper is analyzed and the user receives information regarding the performance of the hydraulic crimper on both the mobile electronic device 108 and the external device 116.

Figure 23:
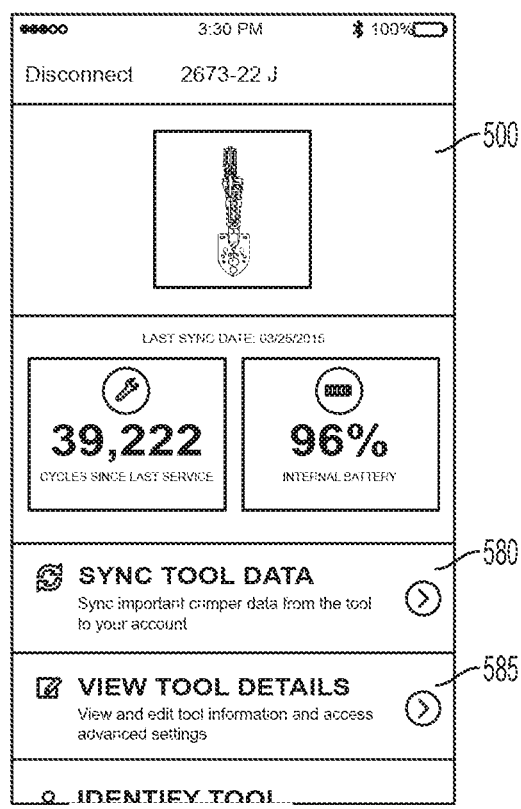
FIG. 23 illustrates an exemplary home screen for a crimper.

As discussed above, the mobile electronic device 108 can wirelessly communicate with communicating power tool devices 104a-c. As also discussed above, the mobile inventory and reporting application can display a list of nearby power tool devices. A user can select one of these devices, and the mobile inventory and reporting application displays a power tool device home screen 500 (FIG. 23) in response to detecting the user selection. The power tool device home screen 500 varies based on the specific power tool device 104 selected by the user. For at least some of the power tool devices 104, the power tool device home screen 500 illustrates metrics on the performance of the specific power tool device 104. The following example illustrates a home screen 500 for a hydraulic crimper. The home screen 500 for the hydraulic crimper provides metrics information 502 regarding the performance and operation of the hydraulic crimper. Similar aspects of the home screen 500 may be available for other power tool devices 104.

Figure 24:
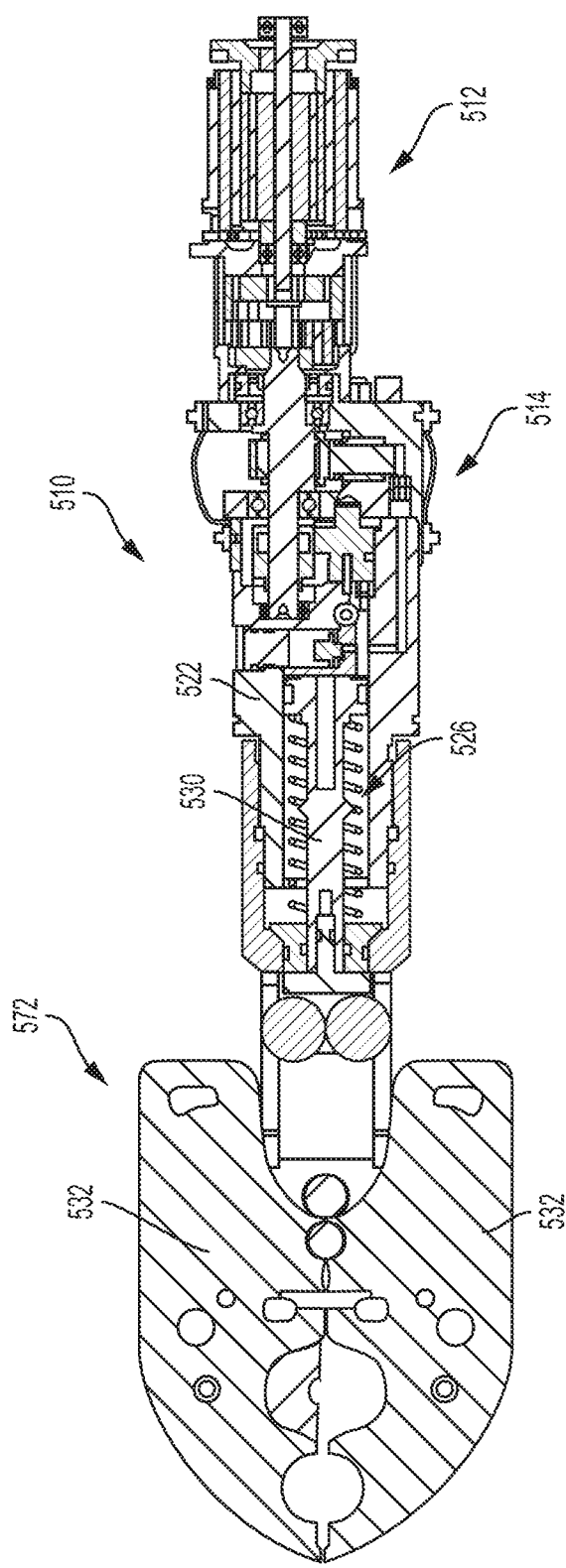
FIG. 24 is a cross-sectional view of a crimper.

As shown in FIG. 24, the hydraulic crimper 510 includes an electric motor 512, a pump 514 driven by the motor 512, a housing 522 defining a cylinder 526 therein, and an extensible piston 530 disposed within the cylinder 526. The crimper 510 also includes electronic control and monitoring circuitry (not shown) for controlling and/or monitoring various functions of the hydraulic power tool. As is described in more detail below, the pump 514 provides pressurized hydraulic fluid to the piston cylinder 526, causing the piston 530 to extend from the housing 522 and thereby actuate a pair of jaws 532 for crimping a workpiece. The jaws 532 are a part of a crimper head 572, which also includes a clevis 574 for attaching the head 572 to a body of the crimper 510, which otherwise includes the motor 512, pump 514, housing 522, and piston 530. The crimper head 572 can include different types of dies depending on the size, shape, and material of the workpiece. For example, the dies can be used for electrical applications (e.g., wire and couplings) or plumbing applications (e.g., pipe and couplings). The size of the die can depend on the size of the wire, pipe, or coupling. The shape formed by the die can be circular or another shape. The dies can be configured to crimp various malleable materials and metals, such as copper (Cu) and aluminum (Al). Although FIG. 24 illustrates a hydraulic crimper 510, the inventions described herein and the interaction of the power tool device with the inventory and reporting application are applicable to a wide range of power tool devices (e.g., cutters, knockout punches, drills, etc.).

Figure 26:
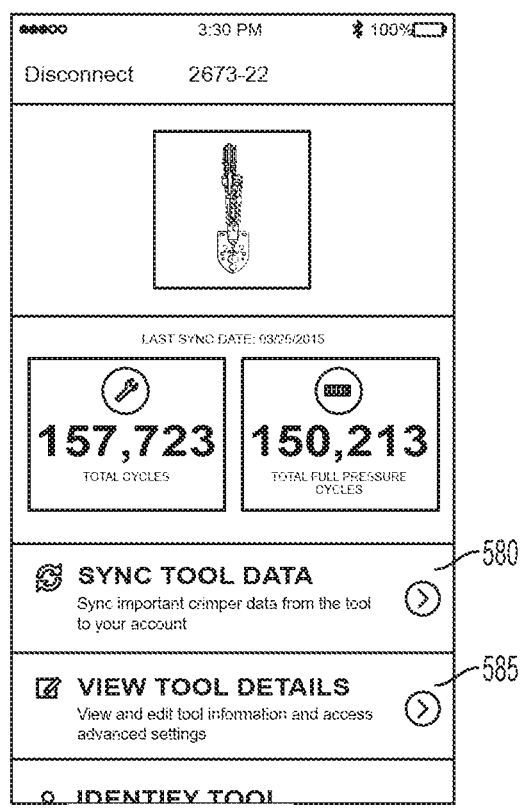
FIG. 26 illustrates a second exemplary home screen for the crimper.

The crimper 510 also includes a wireless communication module 109 and a back-up power supply 110 as discussed with respect to FIG. 2. In the illustrated embodiment, however, the back-up power supply 110 is positioned at a hard-to-access location of the crimper 510. To replace the back-up power supply 110 on the crimper 510, a professional service person takes apart some portions of the crimper 510 and replaces the back-up power supply 110. The crimper 510 transmits power tool operation data to the mobile electronic device 108 through the wireless communication module 109. In particular, the crimper 510 sends pressure data and other sensor data for each operation (e.g., crimping) the crimper 510 performs. The mobile electronic device 108 receives the pressure and sensor data from the crimper 510 and forwards the data to the remote server 112. Referring back to FIG. 23, the home screen 500 for the crimper 510 provides some overview information regarding the crimper 510. In particular, the metrics information 502 of the home screen 500 indicates a battery voltage/energy remaining on the back-up power supply 110 of the crimper 510 and a number of cycles performed by the crimper 510 since the last service was performed on the crimper 510. The home screen can alternatively or additionally provide other metric information to the user. For example, the home screen 500 can indicate total number of cycles completed by the crimper 510 and/or the total number of full pressure cycles completed by the crimper 510, as shown in FIG. 26. In the illustrated embodiment, the user can select which information is presented on the home screen 500 of the power tool device (e.g., by swiping left or right across the displayed information). In other words, the mobile electronic device 108 may provide the user with display options and store the user selected display options such that the next time the user enters the crimper home screen 500, the mobile electronic device 108 displays the user's most recently elected choices.

The home screen 500 of the crimper 510, or any other power tool device, also includes a sync tool data selector 580 and a view tool details selector 585. Selecting the sync tool data selector 580 initiates electronic data transfer from the crimper 510 to the mobile electronic device 108. The electronic data includes pressure and other sensor data associated with each operation the crimper 510 has performed since the last sync. Selecting the view tool details selector 585 allows a user to change tool information as discussed above with respect to the inventory feature. In some embodiments, the view tool details selector 585 also enables the user to configure modes for the crimper 510, change operating parameters, etc.

When the crimper 510 sends the operational data to the mobile electronic device 108, the mobile electronic device 108 compares the pressure data to a predetermined full pressure range (e.g., a high pressure threshold and a low pressure threshold). For each operation completed by the crimper 510, the mobile electronic device 108 determines whether the final pressure reached by the crimper 510 is within the predetermined full pressure range. If the final pressure is within the predetermined full pressure range, the crimper 510 is considered to have completed a full pressure cycle. If, however, the final pressure is outside (e.g., below or above) the predetermined full pressure range, the crimper 510 is considered to not have reached full pressure. This determination made by the mobile electronic device 108 generates the counts shown in the home screen 500 of the crimper 510. Specifically, by comparing the received final pressure information to the predetermined full pressure range, the mobile electronic device 108 is able to determine how many cycles the crimper 510 has completed, and how many of the completed cycles were completed to full pressure 510, as shown in FIG. 26.

The mobile electronic device 108 communicates with the remote server 112 to forward the final pressure data points, the total number of cycles completed by the crimper 510, and the total number of full pressure cycles completed by the crimper 510. The remote server 112 can store the performance analysis for the crimper 510. When the inventory and reporting application is launched on the external device 116, the external device 116 communicates with the remote server 112 to receive updated information regarding the power tool devices 104.

The inventory and reporting application includes a reporting option 600 when launched on the external device 116. Selecting the reporting option 600 allows a user to have access to performance data for different power tool devices and generate meaningful reports on the performance of specific power tool devices or groups of power tool devices.

Figure 25:
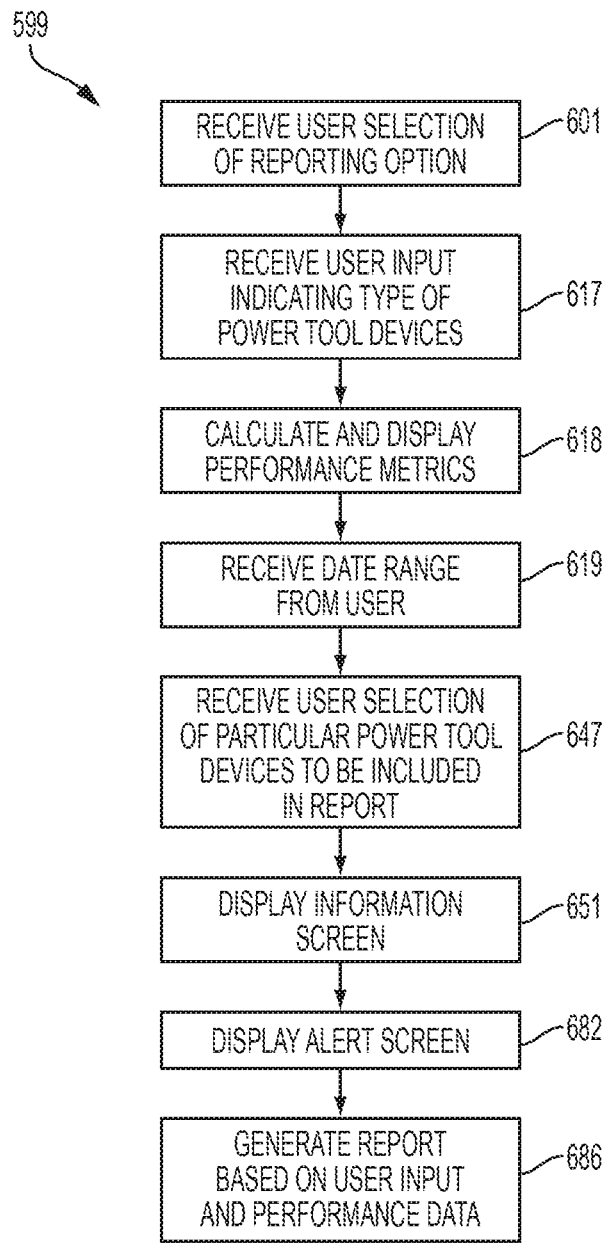
FIG. 25 is a flowchart illustrating a method for generating reports from the inventory and reporting application.
Figure 27:
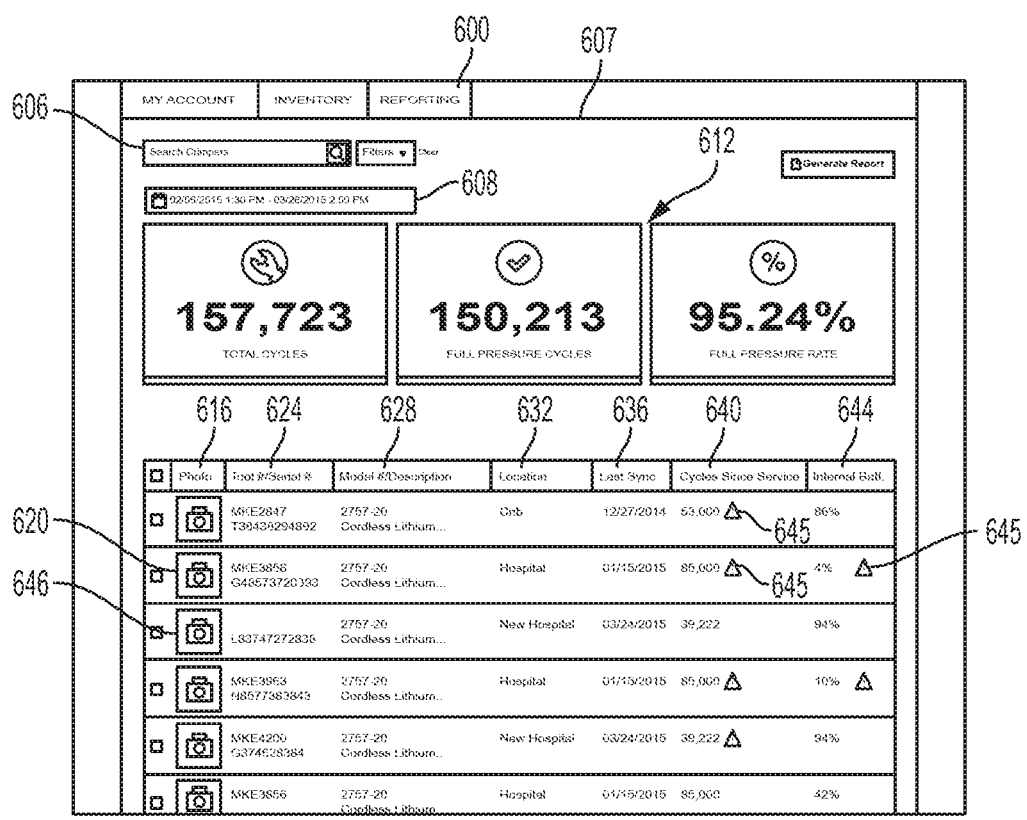
FIG. 27 illustrates a start reporting page on a mobile external device.

FIG. 25 is a flowchart showing a process 599 for generating a report on the performance of one or more power tool devices 104. In the illustrated embodiment, the report quantifies the performance of the crimper 510. In other embodiments, the generated report may quantify the performance of other power tool devices. First, the inventory and reporting application detects an indication that the user selected the reporting option 600 (step 601). The inventory and reporting application then generates a reporting start page 604, as shown in FIG. 27. The reporting start page 604 includes a search field 606, a date range field 608, a quick reporting area 612, and a power tool device list 616. The inventory and reporting application receives an indication from the user regarding the specific type of power tool devices that the user wishes to analyze (step 617). In the illustrated embodiments, a filter selection (see search field 606) has been entered such that only crimpers are displayed on the reporting start page 604. In some embodiments, a report can be generated for one power tool device 104 or multiple power tool devices 104 of the same type (e.g., three crimpers, or two impact wrenches, etc.). In other embodiments, the report can include different portions, each dedicated to one power tool device 104 or one type of power tool devices 104. The different portions can then be presented to the user as a single report.

The inventory and reporting application generates common performance metrics applicable to all the displayed power tool devices 104 and displays the common performance metrics on the quick reporting area (step 618). The quick reporting area 612 indicates select metrics related to the operation of the power tool devices listed. In FIG. 27, the quick reporting area 612 shows a total number of cycles performed by the crimpers 510 collectively, a total number of full pressure cycles, and a percentage of the full pressure cycles compared to the total number of cycles. In the illustrated start page 604, only one type of power tool device 104 is shown. However, in other instances, common performance metrics for different tool types are shown. In other instances, when the reporting start page 604 is not restricted by a filter to a specific type of power tool device 104, the inventory and reporting application may not display any performance metrics on the quick reporting area 612 and step 618 is bypassed.

Figure 28:
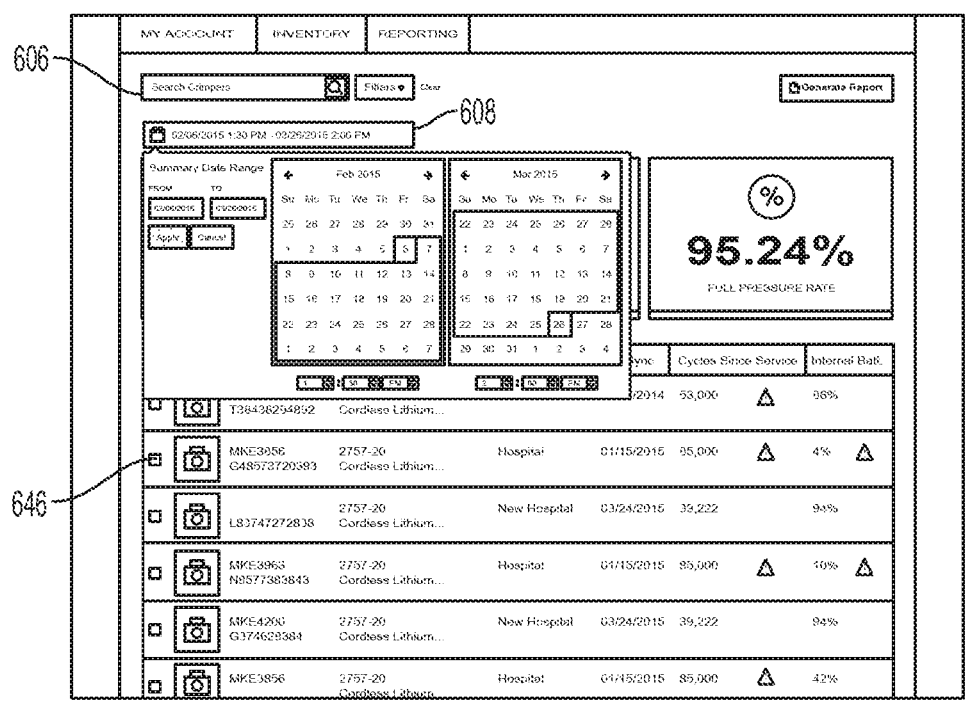
FIG. 28 illustrates a start reporting page with an expanded date field.

In the illustrated embodiment, the power tool device list 616 includes only crimpers. The crimpers shown in the power tool device list 616 provide the power tool usage data to generate the common performance metrics shown in the quick reporting area 612. Once the user has specified the type of power tool devices to be used, the user also specifies the date range for the report. The date range field 608 is used to specify a particular time period for which power tool device performance is analyzed. In one example, the performance report is run four times per year. In other embodiments, the performance report may be run more or less frequently. As shown in FIG. 28, the user can select specific dates to run the performance report. The inventory and reporting application receives the user's indication of the date range for the report and uses the specified date range to limit the power tool usage data used in the creation of the report (step 619). In some embodiments, the user may not need to specify particular dates. Rather, the inventory and reporting application may provide common options for date ranges such as, for example, one week, one month, one quarter, one year, etc.

The list 616 of power tool devices, specifically crimpers 510, provides information to the user regarding the power tool devices. The information shown to the user is received by the external device 116 from the server 112. As shown in FIG. 27, the list 616 provides an image 620 of the specific power tool device, a tool and/or serial number 624, a model number and/or description of the power tool device 628, a location 632, the date on which the power tool device was last synced 636, number of cycles completed 640 since the crimper 510 was serviced, and an indication of the percentage of remaining voltage on the back-up power supply 644. The indication of remaining voltage on the back-up power supply 644 is helpful, in particular, for those power tool devices 104 in which the back-up power supply is inaccessible to an operator of the power tool device 104 (e.g., the crimper 510).

As shown in FIG. 27, some of the power tool devices may also include a warning icon 645 when an aspect of the power tool device (e.g., the crimper 510) that is to be addressed. For example, the inventory and reporting application may display a warning icon 645 associated with a particular power tool device 104 when the voltage percentage of the back-up power supply 110 drops below a certain threshold. Such a warning icon 645 alerts the user to take the power tool device 104 (e.g., the crimper 510) to a service center to replace the back-up power supply 110. In some embodiments, the power tool device 104 itself can output a warning indication (e.g., a red light, a vibration, sound, etc.) when the back-up power supply 110 is approaching a low voltage threshold. In other embodiments, the power tool device 104 provides no indication of the voltage level of the back-up power supply 110, and the user relies on the inventory and reporting application to be alerted when the back-up power supply 110 is to be replaced. The inventory and reporting application may additionally or alternatively display a warning icon 645 when the number of cycles since the last service approaches or exceeds a certain threshold. As shown in FIG. 27, some of the warning icons 645 may be more or less dark or apparent than others. With respect to the warning icon 645 displayed based on the number of cycles since the last service, the warning icon may appear darker and darker as the number of cycles since the last service increases and thereby approaches the predetermined threshold.

Figure 29:
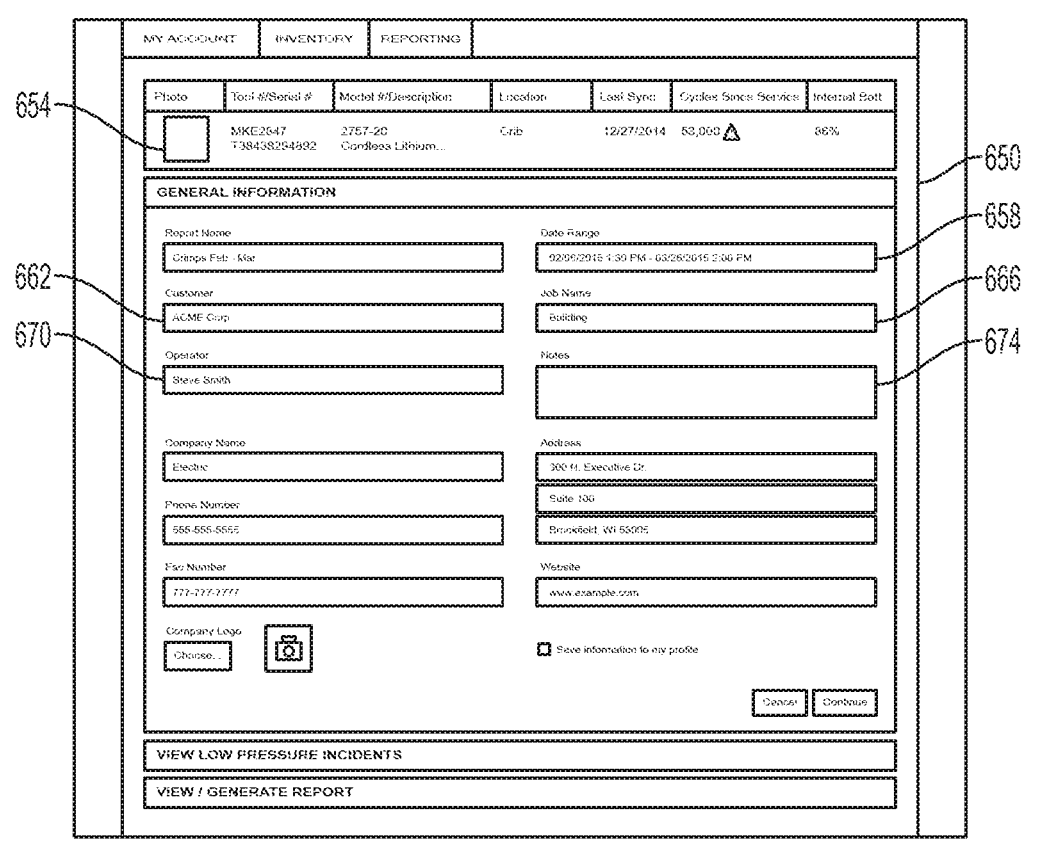

From the list 616 of the power tool devices, the user can also select one or more power tool devices (e.g., crimper 510) to analyze their performance by selecting specific checkboxes 646 shown in FIG. 28. The inventory and reporting application receives an indication from the user specifying one or more power tool devices 104 for which performance data is to be analyzed (step 647). As shown in FIG. 29, when the user selects one of the crimpers (or other power tool device 104), the inventory and reporting application displays an information screen 650 for each of the selected power tool devices 104 (step 651). The information screen 650 contains general information regarding the crimper 510. In particular, the information screen 650 includes the power tool device name 654, a date range 658, a specific customer (if applicable) 662, a job name (if applicable) 666, an operator 670, notes 674, and other relevant information. In the illustrated embodiment, the user selected power tool device number 2757-20. The inventory and reporting application displays this information to the user to provide the user an opportunity to verify that the crimper selected is the correct crimper.

Figure 30:
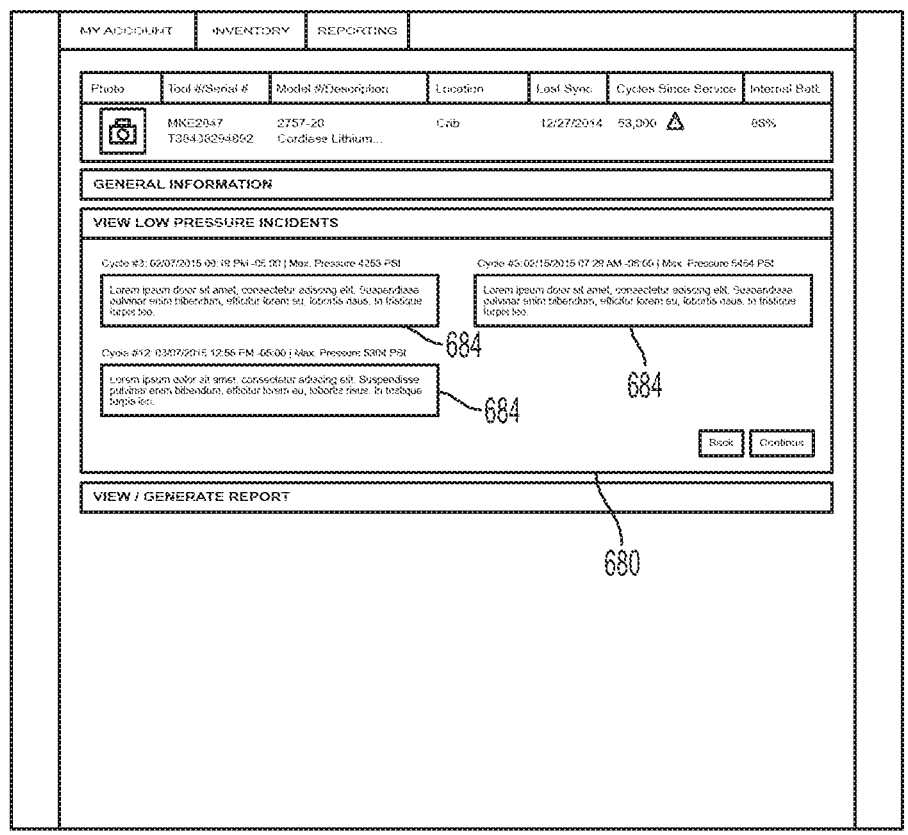
FIG. 30 illustrates an exemplary alert screen.

After the user sufficiently verified the information shown on the information screen 650, the inventory and reporting application displays an alert screen 680 to the user (step 682). The alert screen 680, as shown in FIG. 30, is based on the number of cycles for which the crimper 510 did not achieve full pressure. More particularly, the alert screen 680 includes one or more alerts 684. Each alert 684 provides information regarding a cycle of the crimping machine. For example, as shown in FIG. 30, the alert 684 includes a cycle number, a date and time associated with the detected failure, the maximum pressure reached by the crimper, and a text box. In some embodiments, the alert 684 also includes a tool identifier (e.g., the tool name, the tool serial and/or model number, etc.). A user can determine whether the alert 684 is substantive, and may include notes in the text box explaining why the crimper 510 failed to reach full pressure and/or what actions were taken to compensate for the crimper 510 not reaching full pressure. In some embodiments, the inventory and reporting application does not continue to generate a report until each of the alerts 684 has been addressed by the user by typing characters into the text box. In the embodiments for which more than one power tool device 104 was selected to be included in the report, the alert screen 680 may include alerts pertaining to more than one power tool device 104. The user then addresses different alerts pertaining to different power tool devices 104 from a single screen.

Figure 31:
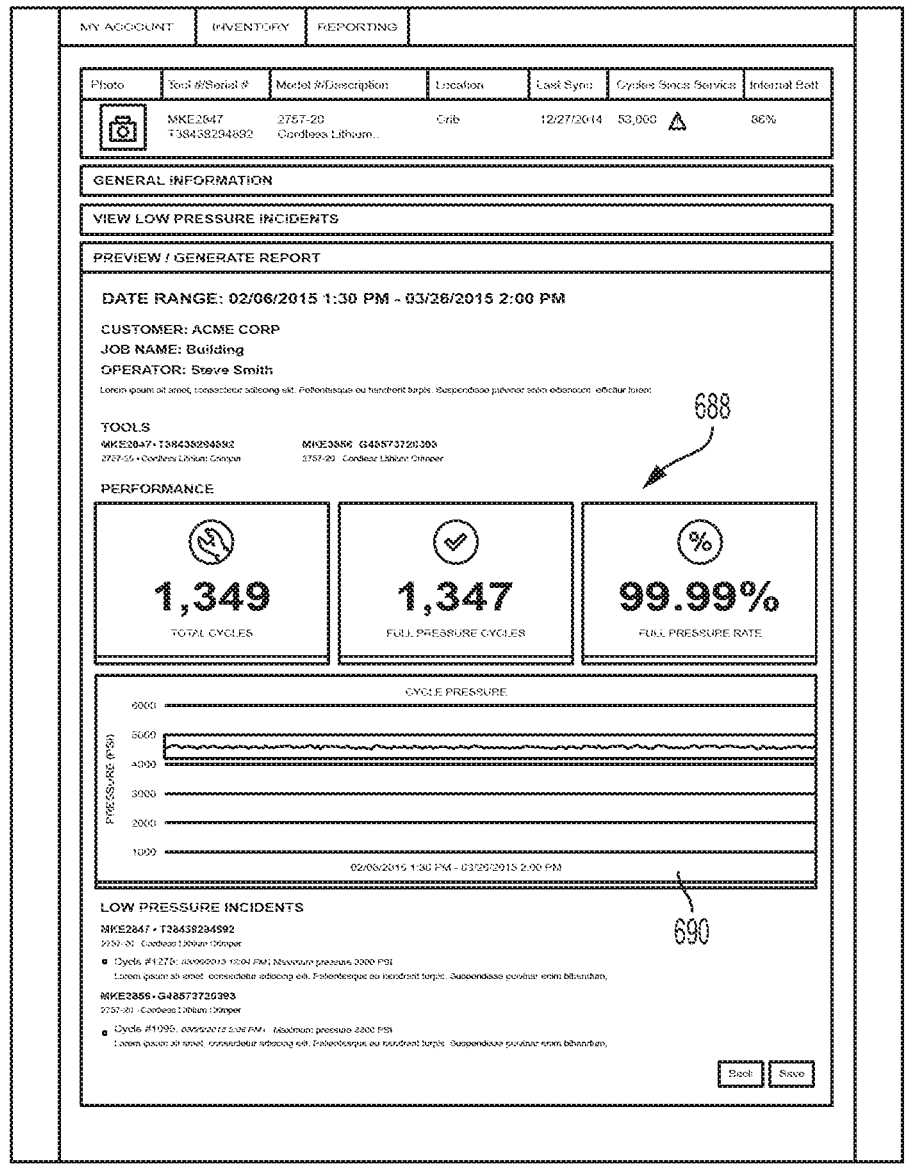
FIG. 31 illustrates an exemplary report screen.

After addressing the alerts 684, the inventory and reporting application generates a report that analyzes the performance of one or more specific power tool devices (step 686). As shown in FIG. 31, the report includes overview information such as, for example, a date range for the report, a customer, a job name, an operator, etc. The report also identifies the tools analyzed while performing the report. The tools analyzed for the generated report are listed under the heading "Tools." In other embodiments, the heading may be different. In the illustrated embodiment, the report is generated for two crimpers. Additionally, the report includes a quick reporting area 688 for providing high-level indicators of the performance of the one or more power tool devices. In the illustrated embodiments, the quick reporting area 688 includes information regarding the total number of cycles completed by the crimpers 510 included in the report, the total number of full pressure cycles, and the percentage of total full pressure cycles. In other embodiments, other performance measures may be displayed in the quick reporting area 688. In particular, the quick reporting area 688 and the nature of the alerts changes based on the power tool device being analyzed. For example, if a torque specific tool was being analyzed, the quick reporting area 688 may include information about the total number of fastening applications, the number of fastening application that reached optimal torque, etc. Also, to generate the performance metrics shown in the quick reporting area 688 and in the rest of the report, the inventory and reporting application may process data from more than one power tool device 104. For example, the inventory and reporting application may be summed, averaged, or otherwise combined for display on the report. Additionally or alternatively, the data for each power tool device 104 may be displayed separately.

The report also includes a graphical display 690 illustrating specific data points of the performance data. In the illustrated embodiments, the graphical display 609 includes information regarding the final pressure reached by the crimper 510 and the full pressure range. As shown in FIG. 31, a couple of data points are noticeably outside of the full pressure range, thereby indicating that at least two cycles were not completed to full pressure. Below the graphical display, the report includes the alerts 684 addressed as part of the alert screen 680. In other embodiments, the layout of the report may be different. For example, the alerts 684 may be positioned elsewhere on the screen, and/or the general information may also be placed elsewhere.

Although the reports generated by the inventory and reporting application were only described in relation to the crimper, similar methods can be followed for other and different electric power tool devices. Additionally, although the generated report was illustrated in a particular set-up, other arrangements of information may be implemented based on user preferences and/or specific power tool devices.

Figure 32:
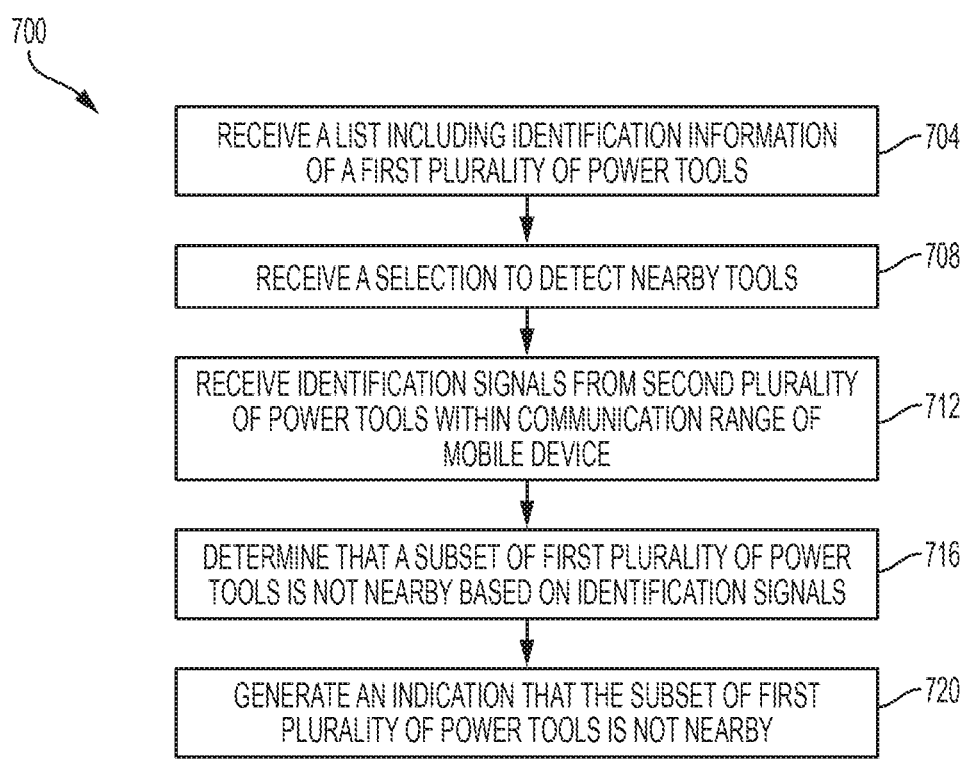
FIG. 32 is a flowchart illustrating a method for determining power tool attendance.

FIG. 32 illustrates an exemplary method 700 of determining power tool attendance. The mobile electronic device 108 receives a list of a first plurality of power tools (step 704). As described above, the list may be an inventory of power tools assigned to the user of the mobile electronic device 108. As described above, the mobile electronic device 108 may receive the list from the remote server 112. Alternatively, as described above, the user of the mobile electronic device 108 may create the list of the first plurality of power tools (i.e., the user's inventory) at the mobile electronic device 108, for example, by creating an inventory via the touch display 212 of the mobile electronic device 108.

The mobile electronic device 108 receives a selection to detect nearby tools (step 708). As described above, the mobile electronic device 108 may receive the selection when a user selects a "tool attendance" selector on the inventory screen 236 of FIG. 10. The mobile electronic device 108 receives identification signals from a second plurality of power tools within communication range of the mobile electronic device 108 (step 712). As described above, the power tools 104a-c broadcast identification information for the power tool device 104. The mobile electronic device 108 detects which power tool devices 104 are nearby based on the broadcast signals from the power tool devices 104. The power tools devices 104 may broadcast the signals periodically (unprompted by an external device) or may broadcast in response to a ping from the mobile electronic device 108.

The mobile electronic device 108 determines that a subset of the first plurality of power tools is not nearby (i.e., missing) based on the identification signals received (step 716). As described above, the mobile electronic device 108 compares the list of the first plurality of electronic device to the second plurality of electronic devices. The mobile electronic device 108 determines which of the first plurality of electronic devices are or not found nearby based on the identification signals. The subset of the first plurality of electronic devices may include only one power tool 104 or multiple power tools 104. That is, the mobile electronic device 108 may determine that one or more of the first plurality of power tools is or not found nearby by determining that a signal was not received from the one or more power tools 104 making up the subset within a predetermined time period. Thus, the absence of a signal from a particular power tool 104 indicates to the mobile electronic device 108 that the particular tool is not nearby. The mobile electronic device 108 generates an indication that the subset of the first plurality of power tools is not nearby (i.e., missing) (step 720). As described above, the mobile electronic device 108 may display the subset of the first plurality of power tools on the touch display 212.

In some embodiments, the inventory and reporting application receives, from one or more mobile electronic devices 108, the voltage levels of the back-up power supplies 110 of a plurality of the power tools 104. As described above, the one or more mobile electronic devices 108 receive the voltage levels of the back-up power supplies 110 wirelessly from the respective power tools 104 via respective wireless communication controllers 109. The inventory and reporting application, in turn, generates a list of the power tools 104 and the voltage levels of the respective back-up power supplies 110. Additionally, the inventory and reporting application determines whether each voltage level is below a first low battery threshold and whether each voltage level is below a second low battery threshold. The second low battery threshold is a lower level than the first low battery threshold and is indicative of a back-up power supply being nearer to depletion and in need of replacement. The inventory and reporting application then generates an indication (e.g., warning icon 645) for each power tool having a back-up power supply 110 with a voltage level below the first or second low battery threshold. For example, with reference to FIG. 27, the inventory and reporting application may generate a list of the power tools 104 along with a low battery indication for each power tool 104 having a back-up power supply 110 having a voltage level below the first or second low battery threshold. For example, in FIG. 27, a warning icon 645 having a first form is used to indicate a back-up power supply 110 at 10% is below the first low battery threshold, and a warning icon 645 having a second form, which is darker than the first form, is used to indicate a back-up power supply at 4% is below the second low battery threshold.

Figure 33:
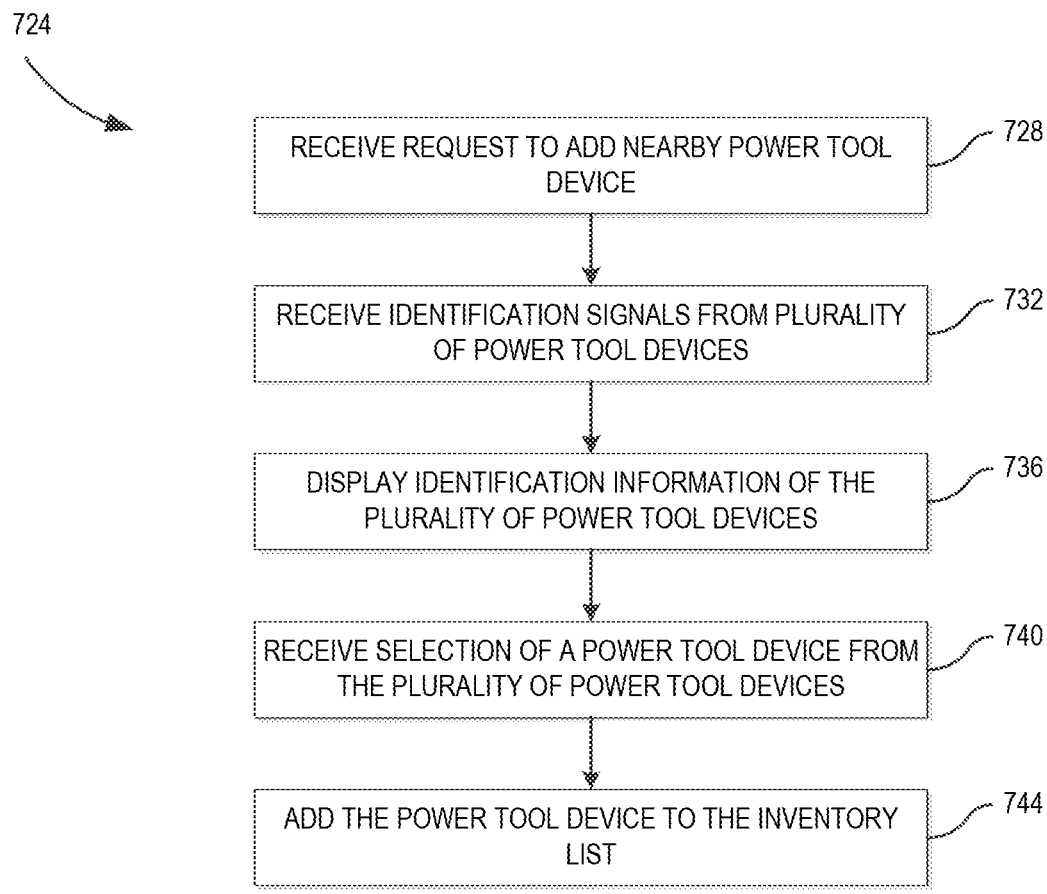
FIG. 33 is a flowchart illustrating a method for adding power tool devices to an inventory list.

FIG. 33 illustrates an example method 724 for adding a power tool device to an inventory list. The mobile electronic device 108 receives a request to add a nearby power tool device (step 728). The mobile electronic device 108 receives the request from a user interface (for example, the touch display 212). As described above, the mobile electronic device 108 may receive the request when a user selects the add item option 248 on the inventory screen 236 of FIG. 10.

The mobile electronic device 108 receives identification signals from a plurality of power tool devices 104 within communication range of the mobile electronic device 108 (at step 732). As described above, the power tools 104a-c broadcast identification information for the power tool device 104. The mobile electronic device 108 detects which power tool devices 104 are nearby based on the broadcast signals from the power tool devices 104. The power tools devices 104 may broadcast the signals periodically (unprompted by an external device) or may broadcast in response to a ping from the mobile electronic device 108.

The mobile electronic device 108 displays identification information of the plurality of power tool devices 104 (at step 736). For example, the mobile electronic device 108 displays the identification information on a touch display 212 of the mobile electronic device 108. The mobile electronic device 108 receives a selection of a power tool device 104 from the plurality of power tool devices 104 (at step 740). As described above, the mobile electronic device 108 receives the selection of the power tool device 104 when the user selects the power tool device 104 on the touch display 212 of the mobile electronic device 108.

The mobile electronic device 108 adds the power tool device 104 to the inventory list (at step 744). As described above, the mobile electronic device 108 and the inventory and reporting application save the information of the power tool device 104 to the inventory list. The inventory list may be stored on the remote server 112.

In some embodiments, another process is provided for adding a new power tool device using the mobile electronic device 108 to an inventory of a user. With reference to FIG. 14, the user selects the add a nearby device (option 264) from the add item screen 252. The inventory and reporting application receives signals from the communicating power tool devices 104a-c within communication range of the mobile electronic device 108. The signals from the communicating power tool devices 104a-c include identification information for each power tool device. The identification information includes, for example, a customized name associated with the power tool device, a model number, a unique identifier, a tool number, etc. In some embodiments, the power tool devices 104 may periodically broadcast the identification information for the power tool device 104 without requiring a ping signal from the mobile electronic device 108, and in other embodiments, the mobile device 108 sends a ping signal and the power tool devices 104 that are nearby (i.e., within communication range) reply with the signal including identification information.

The inventory and reporting application then compares the received responses to the power tool devices already in the inventory of the user. If a received response corresponds to a power tool device 104 that is already part of the inventory, the inventory and reporting application does not display that power tool device 104 to the user and continues to check the rest of the responses (step 282). If, on the other hand, the received response corresponds to a power tool device 104 that is not part of the inventory, the inventory and reporting application displays the power tool device 104 to the user (step 286). Thereby, the inventory and reporting application only displays those power tool devices 104 that are nearby and that are not already part of the inventory for the user. See, for example, FIG. 15, which illustrates a list generated by the inventory and reporting application that identifies a power tool device that is nearby and not yet part of the user's inventory. The mobile device 108 then receives a user selection of one of the listed power tools, and, in response, adds the power tool to the inventory of the user.

Figure 34:
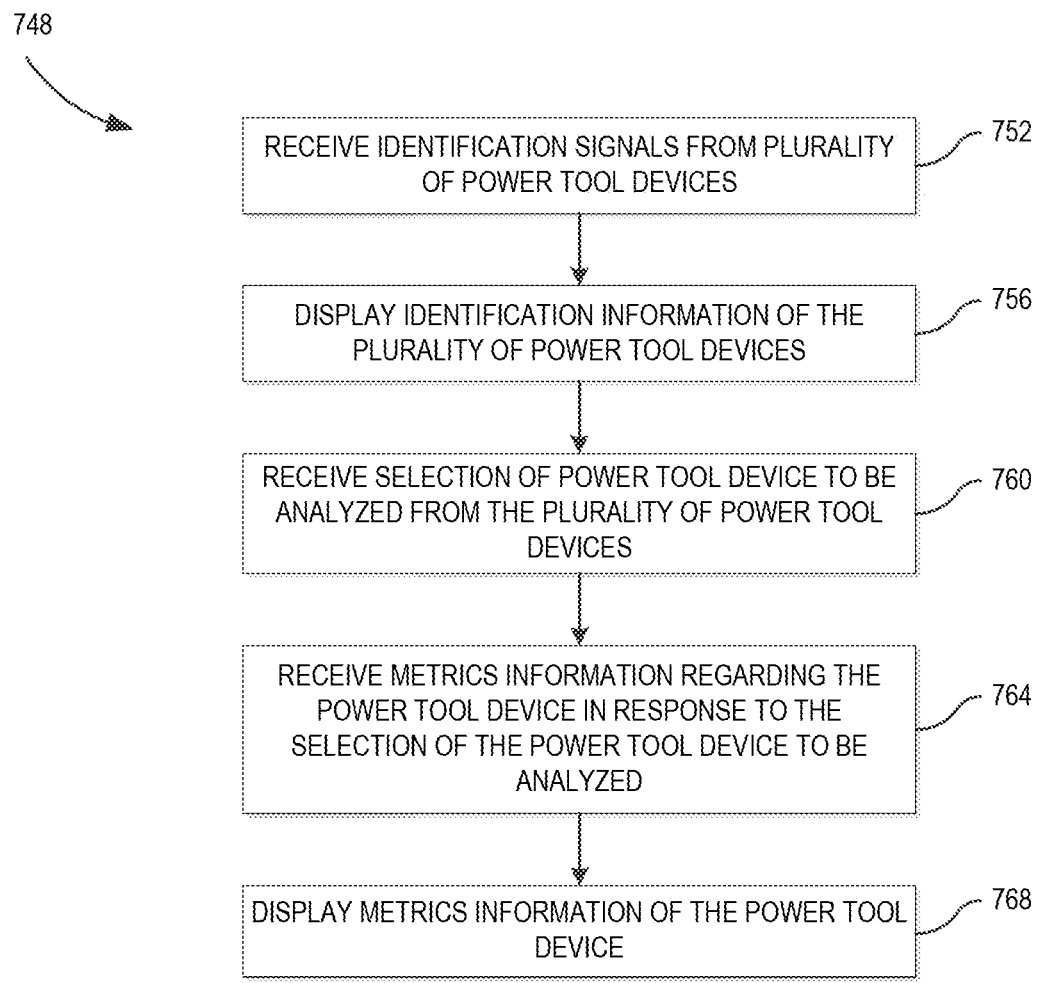
FIG. 34 is a flowchart illustrating a method for analyzing metrics for a power tool device.

FIG. 34 illustrates an example method 748 for analyzing metrics information of a power tool device 104. The mobile electronic device 108 receives identification signals from a plurality of power tool devices 104 within communication range of the mobile electronic device 108 (at step 752). As described above, the power tools 104a-c broadcast identification information for the power tool device 104. The mobile electronic device 108 detects which power tool devices 104 are nearby based on the broadcast signals from the power tool devices 104. The power tools devices 104 may broadcast the signals periodically (unprompted by an external device) or may broadcast in response to a ping from the mobile electronic device 108.

The mobile electronic device 108 displays identification information of the plurality of power tool devices 104 (at step 756). As described above, the mobile electronic device 108 may display the identification information on a touch display 212 of the mobile electronic device 108. The mobile electronic device 108 receives a selection of a power tool device 104 to be analyzed from the plurality of power tool devices 104 (at step 760). As described above, the mobile electronic device 108 may receive the selection of the power tool device 104 when the user selects the power tool device 104 on the touch display 212 of the mobile electronic device 108.

The mobile electronic device 108 receives metrics information regarding the power tool device 104 in response to the selection of the power tool device 104 to be analyzed (at step 764). As described above, the mobile electronic device 108 receives metrics information of the power tool device 104 via the short-range transceiver, for example over a Bluetooth® connection. The power tool device 104 may transmit the metrics information when it receives a request from the mobile electronic device 108 in response to the selection or a further user input (e.g., by selecting the sync tool data selector 580 (FIG. 23)).

The mobile electronic device 108 displays the metrics information for the power tool device (at step 768). As described above, the mobile electronic device 108 may display the metrics information on a touch display 212 of the mobile electronic device 108 (see, e.g., FIGS. 23 and 26).

Throughout the above description, reference is made to the inventory and reporting application or other software as taking action (e.g., receiving, generating, displaying, and the like). Such actions may be performed by the device on which the application or software is being executed (e.g., the mobile device 108 or the external device 116) in response to or based on the execution of the application or software on that device.

Thus, the invention provides, among other things, a system that allows a user to control, manage, and maintain a large number of power tool devices. Various features and advantages of the invention are set forth in the following claims.

The invention claimed is:

1. A method for sectioning power tool inventory comprising:
   generating, at an external device, a sub-inventory of power tool devices based on a full inventory of power tool devices;
   assigning, at the external device, the sub-inventory of power tool devices to a user;
   communicating, by the external device, the sub-inventory of power tool devices and user assignment to the remote server for storage on the remote server;
   identifying, with a mobile electronic device to the remote server, that the user is associated with the mobile electronic device;
   transmitting, from the remote server, the sub-inventory of power tool devices as an inventory for the user of the mobile electronic device; and
   displaying the sub-inventory of the power tool devices on the mobile electronic device.

2. The method of claim 1, wherein generating the sub-inventory further comprises:
   receiving a selection of a plurality of power tool devices of the full inventory of power tool devices; and
   grouping the plurality of power tool devices together in response to receiving the selection of the plurality of power tool devices.

3. The method of claim 1, further comprising:
   receiving, via a user interface of the mobile electronic device, a request to add a nearby power tool device to the sub-inventory of power tool devices;
   receiving, via a short-range transceiver of the mobile electronic device, identification signals from a plurality of power tool devices;
   displaying, via the user interface, identification information of the plurality of power tool devices;
   receiving, via the user interface, a selection of a power tool device from the plurality of power tool devices displayed on the user interface; and
   adding, using a processor of the mobile electronic device, the power tool device selected from the plurality of power tool devices to the inventory list.

4. The method of claim 3, further comprising:
   determining that the plurality of power tool devices is not in the sub-inventory of power tool devices, wherein displaying the identification information of the plurality of power tool devices is based on determining that the plurality of power tool devices is not in the sub-inventory of power tool devices.

5. The method of claim 3, further comprising transmitting, via the short-range transceiver, a broadcast message in response to receiving the request to add a nearby power tool device to the sub-inventory of power tool devices, wherein receiving the identification signals from the plurality of power tool devices occurs in response to the broadcast message.

6. The method of claim 3, further comprising sending an update for the sub-inventory of power tool devices to the remote server, the update including the power tool device selected from the plurality of power tool devices.

7. The method of claim 1, further comprising:
   receiving, via a user interface of the mobile electronic device, a selection to detect nearby power tool devices;
   receiving, via a short-range transceiver of the mobile electronic device, identification signals from a plurality of power tool devices;
   determining, using a processor of the mobile electronic device, that a subset of the sub-inventory of power tool devices is missing based on the identification signals; and
   generating, using the processor, an indication that the subset of the sub-inventory of power tool devices is missing.

8. The method of claim 7, further comprising generating, using the processor, an indication that the plurality of power tool devices are nearby.

9. The method of claim 1, further comprising receiving, at the external device, the full inventory of power tool devices from the remote server.

10. The method of claim 1, further comprising:
    receiving, via a user interface of the mobile electronic device, a selection of a power tool device to be analyzed from the sub-inventory of power tool devices;
    receiving, via a short range transceiver of the mobile electronic device, metrics information regarding the power tool device in response to the selection of the power tool device to be analyzed; and
    displaying, via the user interface, the metrics information of the power tool device.

11. The method of claim 10, further comprising:
    transmitting, via a network interface of the mobile electronic device, the metrics information associated with the power tool device to the remote server for storage on the remote server.

12. A method for sectioning power tool inventory comprising:
    providing, by a remote server, a full inventory of power tool devices to an external device;
    receiving, by the remote server, a plurality of sub-inventories of power tool devices from the external device, wherein each of the plurality of sub-inventories is assigned to a respective user of a plurality of users;
    updating, by the remote server, inventory information based on the plurality of sub-inventories of power tool devices;
    transmitting, by the remote server, identification information of a user of a mobile electronic device from the mobile electronic device, the user being one of the plurality of users;
    determining, by the remote server, a sub-inventory of power tool devices of the plurality of sub-inventories of power tool devices that is associated with the user of the mobile electronic device; and
    providing, by the remote server, the sub-inventory of power tool devices to the mobile electronic device.

13. The method of claim 12, further comprising receiving, from the mobile electronic device, an update to the sub-inventory of power tool devices for storage on the remote server based on the mobile electronic device adding a power tool device to the sub-inventory of power tool devices.

14. The method of claim 12, further comprising receiving, from the mobile electronic device, metrics information associated with a power tool device of the sub-inventory of power tool.

15. A method for sectioning power tool inventory comprising:
    receiving, at an external device, a full inventory of power tool devices from a remote server;
    generating, at the external device, a sub-inventory of power tool devices based on the full inventory of power tool devices;
    assigning, at the external device, the sub-inventory of power tool devices to a user; and communicating, by the external device, with the remote server to update inventory information on the remote server to include the sub-inventory of power tool devices and an association of the sub-inventory of the power tool devices to the user.

16. The method of claim 15, wherein generating the sub-inventory further comprises:
receiving a selection of a plurality of power tool devices of the full inventory of power tool devices; and
grouping the plurality of power tool devices together in response to receiving the selection of the plurality of power tool devices.

17. The method of claim 15, further comprising:
receiving, on a user interface of the external device, a selection of a reporting option; and
generating, on the user interface, a reporting start page simultaneously displaying a date range field and a list of the sub-inventory of power tool devices in response to receiving the selection of the reporting option.

18. The method of claim 17, further comprising:
receiving, on the user interface, selection of a power tool device to be analyzed from the list of the sub-inventory of power tool devices; and
generating, on the user interface, a report of performance of the power tool device in response to receiving the selection of the power tool device to be analyzed.

19. The method of claim 18, further comprising receiving, on the user interface, a selection of a data range in association with the selection of the power tool device, wherein the report includes performance of the power tool device for the selected data range.

20. The method of claim 18, further comprising generating, on the user interface, an alert screen displaying one or more alerts concerning the power tool device in response to receiving the selection of the power tool device to be analyzed.

* * * * *